US008090351B2

(12) United States Patent
Klein

(10) Patent No.: US 8,090,351 B2
(45) Date of Patent: Jan. 3, 2012

(54) GEOGRAPHICAL LOCATION AUTHENTICATION METHOD

(76) Inventor: Elliot Klein, New York, NY (US)

( * ) Notice: Subject to any disclaimer, the term of this patent is extended or adjusted under 35 U.S.C. 154(b) by 235 days.

(21) Appl. No.: 12/635,847

(22) Filed: Dec. 11, 2009

(65) Prior Publication Data

US 2011/0053559 A1 Mar. 3, 2011

Related U.S. Application Data

(60) Provisional application No. 61/275,603, filed on Sep. 1, 2009.

(51) Int. Cl.
*H04M 1/66* (2006.01)
*H04M 1/68* (2006.01)
*H04M 3/16* (2006.01)

(52) U.S. Cl. .................................................. 455/411

(58) Field of Classification Search .................. 455/411, 455/403, 410
See application file for complete search history.

(56) References Cited

U.S. PATENT DOCUMENTS

| | | |
|---|---|---|
| 7,237,717 B1 | 7/2007 | Rao et al. |
| 7,533,813 B2 | 5/2009 | Knowles |
| 2005/0101307 A1 | 5/2005 | Brugge et al. |
| 2005/0137975 A1 | 6/2005 | Williams |
| 2007/0174082 A1 | 7/2007 | Singh |
| 2007/0235535 A1 | 10/2007 | Davoust |
| 2007/0265909 A1 | 11/2007 | Piccionelli |
| 2009/0072032 A1 | 3/2009 | Cardone et al. |
| 2009/0149192 A1 | 6/2009 | Vargas et al. |
| 2009/0187492 A1 | 7/2009 | Hammad et al. |
| 2010/0127064 A1 | 5/2010 | Barnes et al. |

OTHER PUBLICATIONS

PCT International Search Report and Written Opinion, International Application No. PCT/US2010/047503 dated Apr. 11, 2011.

*Primary Examiner* — William D Cumming
(74) *Attorney, Agent, or Firm* — Michael B. Fein; Eckert Seamans Cherin & Mellott, LLC

(57) ABSTRACT

A system and method for authenticating votes received from a voter's mobile device. A computer is programmed with a set of computer-readable instructions and a includes database accessable by mobile device reading a durable computer readable medium stored in a computer hardware server, the database comprising a registered voter and a geographical location for the registered voter's postal mail delivery address. The system and method receive a vote in an election over a wireless carrier network, determine the geographical location of a device which transmitted the vote over the wireless network comprising cell tower triangulation, and reject the vote if the geographical location of the device which transmitted the vote is not within a predetermined distance from the geographical location for the registered voter stored in the database.

21 Claims, 11 Drawing Sheets

US 8,090,351 B2

GEOGRAPHICAL LOCATION AUTHENTICATION METHOD

This application claims priority to U.S. Provisional Application No. 61/275,603 filed Sep. 1, 2009, which is hereby incorporated herein by reference in its entirety.

BACKGROUND OF THE INVENTION

Consumers utilize the internet from devices such as mobile phones and portable computing devices to conduct trustworthy online banking transfers or internet-based purchase services and goods with a credit card account. These processes use various electronic token and encryption means with passwords, caller ID technology and other biometric security functions to authorize access or complete a purchase online. In contrast, voting in official governmental and other election vote processes have not been able to enjoy the same automated trustworthy methods due to the absence of a reliable paper-verifiable method to count a vote using the internet with a method to mitigate voter fraud.

The current state of art in online voting for state, local and international governmental and other trustworthy elections (e.g., shareholder proxy vote, election of a board of directors, a vote on a local community issue or policy, popularity selection process, etc.) is primarily directed to applications for voter registration that can be accomplished online, but not voting online by internet with a highly reliable or trustworthy voter verification and authentication data method. Instead, a voter is registered by internet methods and computer printouts to record a signature and instructed to then vote at a physical polling location where a voter's identity is re-authenticated and re-verified. Only then is a printed ballot presented for selection and recording.

The other current approach is to use ordinary absentee ballots distributed by U.S. Postal Service mail to the voter's home address and then to allow voters to return them online. A voter typically goes to a web site and downloads a file containing an absentee ballot and a cover sheet. After printing out the file, the voter fills out the cover sheet (giving his name and other signature and certification information) and the ballot. He/she scans the cover sheet and ballot, and uploads the scan to a web site or sends the ballot as fax. Election authority or authorized officials or individuals collect and print the resulting file, and treat the printout like an ordinary absentee ballot.

Many criticize the security of these prior art systems since distribution of blank ballots under the prior art cannot be secure enough since returning filled-out ballots from an ordinary computer and browser presents authentication and security risks. There are integrity and authentication issues because several things can go wrong here: an attacker could subvert the voter's computer and have it modify the ballots before sending them; they could get phished and the phisher could modify their ballot appropriately before passing it on to the central site. Finally, the attacker could subvert the central database server and modify the ballots before they are printed out. These current prior art methods provide no way for a voting authority or other administrator of the voting process to verify or authenticate the physical Postal Service mailing address of the voter or geographical location of the voter as a data authentication and verification method to accept a vote for processing using a consumer device. Further supporting the method's improvement over prior art is the fact geographical data reported by consumer device is reliable and can be considered highly resistant to any broad scale attack or "spoofing." That is because a consumer cannot gain easy access to a personal consumer device to open it and alter. In addition, each device typically includes a normal password authentication requirement to access the device and these and other SIM card identity elements, in combination, are enough to avoid a casual hacker installing a rogue GPS driver onto a consumer device for the purpose of misleading location data of the device for voting.

While the current art does use tools of internet to make a significant impact on current paper-based fill-in ballot election systems, they have heretofore been unknown to use the method of cell tower triangulation geolocation data at the time of a vote, and capturing and assembling data reported by a consumer device with other voter identity and Mobile Sensor API device sensor data gathered and sent to a computer server over the internet, as a data authentication and verification method in context of internet voting systems or methods.

U.S. Publication No. 20050101307 by Torsten et al. teaches a method to perform voting, as well as a vote server, a mobile terminal and a computer program product used for voting. The vote server generates a unique transaction number associated with a specific voting item and a specific subscriber. It transmits the unique transaction number together with the specific voting item to the mobile terminal of the specific subscriber. The mobile terminal sends back a response comprising the vote together with the transaction number and a unique identification number associated with the subscriber of the mobile terminal. The vote server compares the received transaction number and the received identification number with stored values and accepts the vote contained in the response, if the check is positive. The application also describes the application of a SIM card when a mobile terminal receives a voting item from a vote server and performs a subscriber authentication based process.

U.S. Publication No. 20090072032 by Cardone, teaches an apparatus for executing a trusted electronic voting system under the control of an election authority comprising: a. at least one electronic voting machine; b. an election configuration for said voting machine in said electronic voting system; and c. a trusted computing platform for said voting machine in said electronic voting system. While Cardone does provide a trustworthy voting platform, such platform is based on voting at a polling place and fails to teach the advantages and improvements of a voting with a consumer mobile device.

U.S. Publication 20090187492 by Hammad shows how the GPS feature in mobile phones has been used for authentication outside the internet election voting environment. The Hammad invention is directed to authenticating a portable consumer device that is used to conduct a transaction at a merchant. The portable consumer device is authenticated based on location data coming from at least two different sources. For example, first location information may be received from a mobile communication device possessed by a consumer and second location information may be received from a POS terminal operated by a merchant conducting the transaction. If the first location information and the second location information correspond to each other (e.g., they match), then the server computer may authenticate the financial credit card payment transaction. The method of Hammad does not teach registering a geographical location of a voter's postal mail delivery address prior to an election wherein the geographical location consists of longitude and latitude coordinates and storing the resultant registration data in a computer server. It does not teach voting system and methods and instead is directed to financial transaction processing methods. Instead, Hammad 2009/0187492 describes using GPS function of mobile device to authenticate, but in that case the mobile device has to be in the same location more or less to a Point-of-Sale (POS) terminal when the device is used for a sale transaction. The teaching of verifying that a mobile device is where it is supposed to be geographically to carry out a transaction is known. The instant invention for an internet-based mobile vote transaction verified by postal mail delivery address instead of a sale is unobvious and produces unpredictable results. The instant application also differs in requiring registration of the geographical location of the voter's postal address prior to an election. Hammad doesn't require any pre-registration since the Hammad transaction is not carried out at the mobile device owner's home or registered postal mail address in a computer server system.

U.S. Publication 20090149192 by Vargus teaches a device locate service where the GPS feature in mobile phones can be used to locate or remote manage mobile devices such that when the device is misplaced, the device locate service can communicate and provide GPS location signal for a method to disable the device and locate it.

Internet voting using a mobile phone device has also been previously discussed in the Republic of Estonia, a country in Northern Europe. In 2007, Estonia became the world's first country to allow voters in a national parliamentary election to cast their ballots over the Internet. To vote, Estonians put their identification card, which has an electronic chip on it, into a reader attached to their computer and then enter two passwords. The votes are then encrypted for security and opened by the national election committee using a "private key" on Election Day. The Estonian method has not been adopted in any other country because of certain problems with exclusive use of SIM cards for authentication, among which are the fact that the SIM cards are controlled by cellular network carriers and have limited web services processing capabilities.

Numerous other prior art and authentication technique with a consumer device such as a mobile phone or Smartphone is typically applied as a caller ID function of the home phone number or other biometric data function when a consumer calls their local cable company to enquire or to pay a bill. Such automated systems know automatically that a call is from that person's account based on the phone number transmitted by the phone device that is captured by a Caller ID method at a cable company. Similarly, new credit cards sent by postal mail must often be activated by calling from one's home number on record in the database of the card issuer. Under these methods it is relatively possible to change the phone identification number that is shown in a Caller ID function to another number for the purpose of misleading or conducting a fraudulent authentication method. Caller ID methods suffer from certain disadvantages when applied to mobile device voting authentication. For example, not all mobile devices allow caller identification by the recipient, and second, the voter may have more than one mobile device and would have to register the phone number for each of them so the voting system would recognize each device.

In contrast to current Caller ID methods, there are no known methods for a device user to modify the GPS data coordinate transmission processes without disabling the entire GPS data sensor that would render one or more of instant method teachings by Klein to become inoperable. Therefore, the recent technological achievements in the ability of the latest consumer devices to determine and report cell tower triangulation geolocation data coordinates, together with other identity data over the internet, creates a significantly more trustworthy method to enable a voting process with a consumer device associated with the latitude and longitude data matching to a pre-registered Postal Service mail address data distance range to perform a novel and unpredictable voting method.

SUMMARY OF THE INVENTION

With the objective of improving on voter authentication methods and systems to facilitate voting in an election by a voter using a mobile device such as a mobile telephone over a cellular phone network or similar wireless communication device network wherein the election authorities use a computer system to receive, authenticate, and count votes, I have discovered a computer-implemented method for authenticating a mobile device for electronic voting over the internet comprising a. storing a geographical location of a voter's postal mail delivery address prior to an election, wherein the geographical location comprises longitude and latitude coordinates, in a database stored in a computer server to which an election authority has access;

b. upon receiving from a mobile device at the computer server an internet vote by the voter in the election and the geographical location of the device, determining whether the geographical location of the mobile device is within a predetermined distance from the registered geographical location for the voter by cell tower triangulation geolocation ("A-GPS" or "Assisted-GPS"); and c. if the geographical location of the mobile device is not within the predetermined distance from the registered postal address for the voter, rejecting the internet vote.

In another aspect, the invention comprises a computer system for authenticating votes received from a voter's mobile device comprising a computer programmed with a set of computer-readable instructions and a database stored in a computer readable medium, the database comprising a registered voter and a geographical location for the registered voter, means to receive a vote in an election over a cellular or wireless network, means to determine the geographical location of a device which transmitted the vote over the network, and means to reject the vote if the geographical location of the device which transmitted the vote is not within a predetermined distance from the geographical location for the registered voter stored in the database.

Authentication and verification techniques can be combined and transmitted by a wireless consumer device to create an improved, more convenient, trustworthy and reliable voting method by virtue of supplemental and automated authentication data capture and cell tower triangulation geolocation data sensing receiver and reporting combined with internet access vote processing applications that can be uploaded or downloaded into many consumer devices. This computer-readable data can be transmitted by the device to a computer server that can capture and compare data in a server to better authenticate a voter and related vote cast by an individual voter using an internet-connected consumer device for internet voting.

Embodiments of the invention are directed to authenticating and verifying a portable consumer device and individual voter used to conduct a voting event over the internet by cell tower triangulation data communication function and computer server database comparison in the context of voting systems. The portable consumer device is authenticated based on location data coming from at least two different sources. For example, first location information may be received from a mobile communication device possessed by a consumer and second location information may be received from a voter registration database operated by a voting authority conducting the voting process and tabulation of results. If the first location information and the second location information correspond to each other (e.g., they match), then the server computer may authenticate the vote event. In some embodiments, the mobile communication device may be the portable consumer device. In other embodiments, the mobile communication device may be separate from the portable consumer device. For example, the portable consumer device could be a SIM card module that can be inserted into the portable consumer device to provide voter authentication and software processing applications for voting using the device.

DETAILED DESCRIPTION OF THE INVENTION

Figure 1:
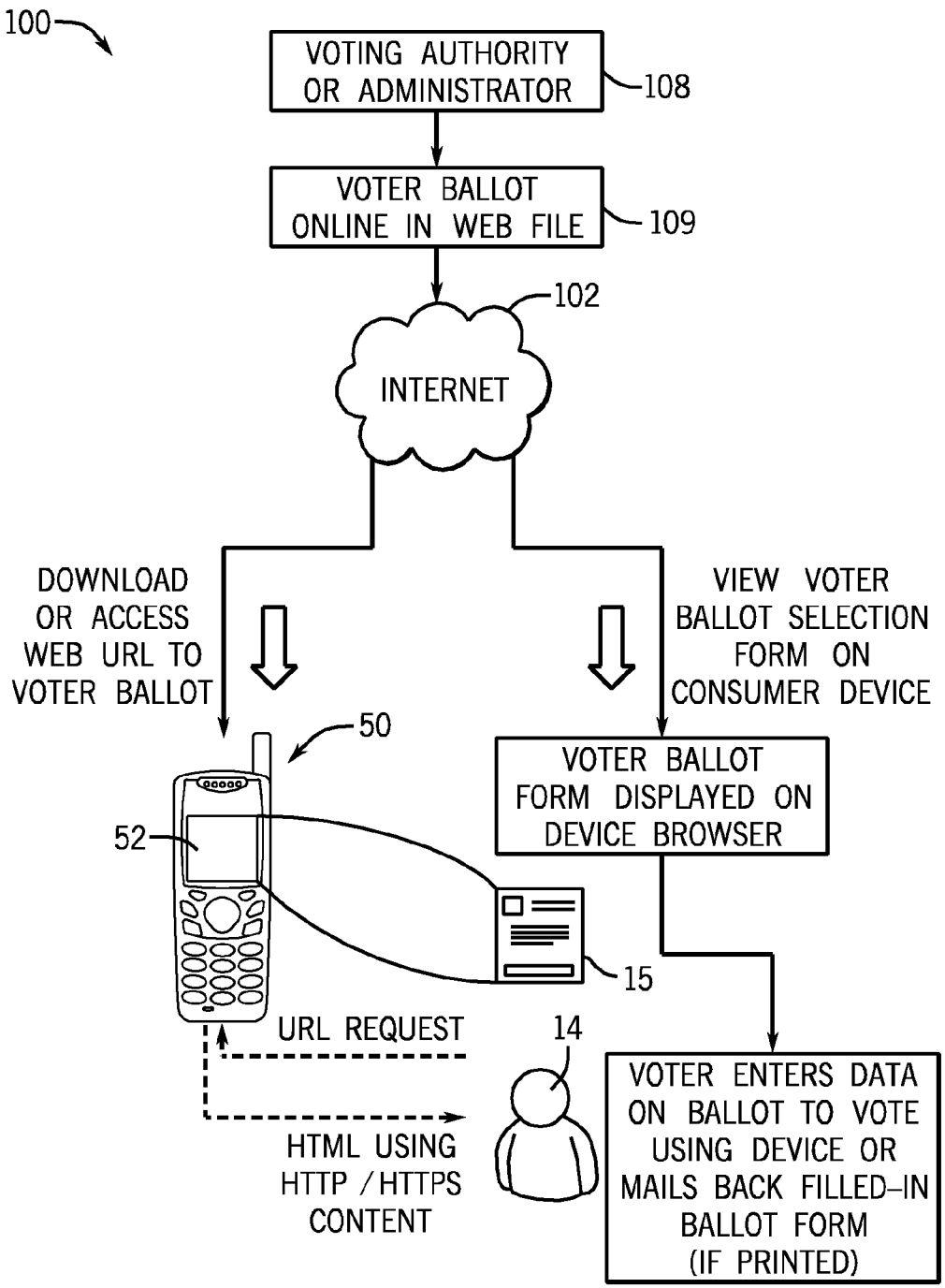
FIG. 1 is an illustration of a prior art of an internet voting method.

FIG. 1 illustrates the prior art 100 method where a voting authority or administrator 108 provides a voter ballot online in a web file. The file is often served from a web URL or other download web site as a PDF file for printout by the voter over the internet 102. Typically, a PC computer device is the preferred method of prior art ballot delivery; however it is possible to deliver this same PDF voter ballot file 109 over internet and onto a consumer device 50. As an option, the form may be downloaded or accessed from a consumer device 50 on the device's browser-based viewing screen 52. The individual voter 14 enters data on the ballot 15 to vote using the device with limited authentication techniques or mails back the printed and filled in ballot form, that may include handwritten signature, by Postal Service mail; or, may deliver or deposit at a polling location if printed on a computer printer device.

Figure 2:
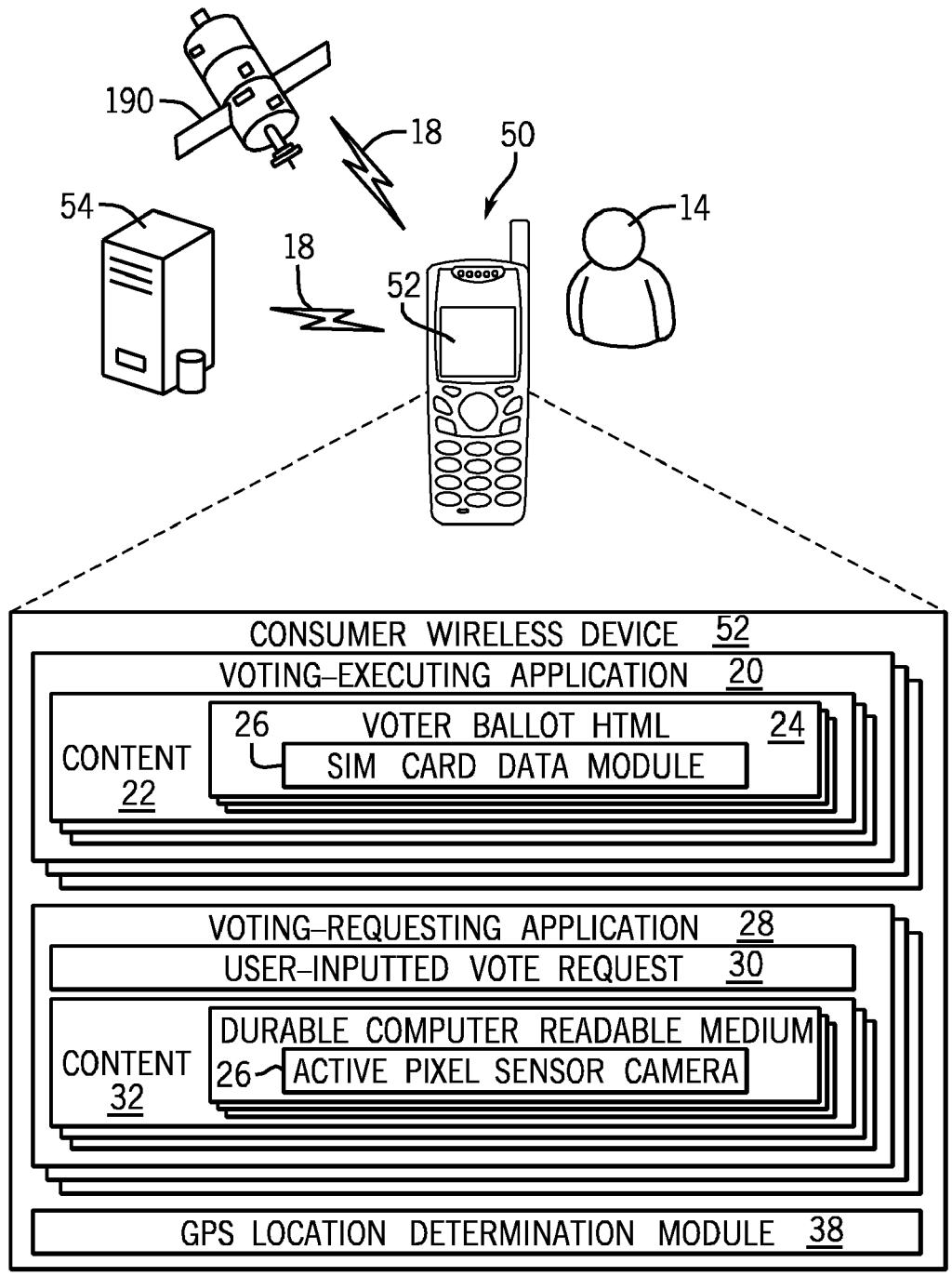
FIG. 2 is a block diagram of the embodiments of the inventive voting method, according to the consumer device data sensor(s), computer server and location capabilities of the consumer wireless device.

FIG. 2 provides a high-level schematic overview of the inventive method 50 for wireless consumer device voter selection based on device location. Thus, the system may be self-contained within wireless device 52 or the method may additionally include network application API software from a remote computer and database server 54, which is in communication with the wireless device through wireless network 18. The network database server device 54 may be included in system 50 as a source for the selected voter executing application 20 software or, in those aspects in which the user's content request 28, the network device 54 may serve as the source for the requested content 32. Additionally, the network device 54 may be used to assist in the determination of the location of the wireless device by comparing to a Postal Service GPS address coordinates. Such coordinates are stored in server 54 which may include a home Postal Service address, or other addresses entered by a voting authority or administrator as permissible addresses for authentication of voting process on the device 52.

Similar to the aspect described in relation to FIG. 1, the wireless device 52 implements one of a plurality of voter ballot access applications that provides for presentation of voter ballot or voter selection choice content by voter 14. In this regard, the plurality of application may include one or more voter-executing applications 20 that execute or present voter content 22.

Additionally, the plurality of applications implemented on the wireless device 52 may include voter-requesting application 28 that provide for user-inputted vote requests 30 or requests alternate durable computer readable network content 32 in reply to the request. In addition, the content 32 that is presented in durable computer readable content-requesting application 28 from a data sensor electronically reading data from an active pixel sensor camera 26 or a Microsoft™ Tag and/or NFC tag(s) read as a durable computer readable medium for inventive voting process 50.

Additionally, wireless device 52 may include a location determination module 38 operable for determining the geographic location of the wireless device 52. The location determination module 38 may provide for satellite-based location determination 190, terrestrial or network-based location determination or a hybrid location determination including both satellite and terrestrial based location determination.

According to some implementation of the invention 50, a suitable consumer device 52, shown as a Smartphone in the FIG. 2, requires the ability to "geocode," that is to take a text based Postal Service mail street address and turn that into a latitude and longitude using a remote computer database server 54 and the built-in data sensor 52. A database server with access to incoming cell tower triangulation geolocation 190 can then determine quite easily if the latitude and longitude reported by the device is within a specified distance of the latitude and longitude of the Postal Service mail address. This geocoding functionality is incorporated into a computer server 54 for voting applications herein described 50. The server 54 includes a MapTP Web Services API installed in the server to determine if geographical location data coordinates match the database 54 in the computer server for voter 14 to be authenticated to perform a voting application on the device 52.

Figure 3:
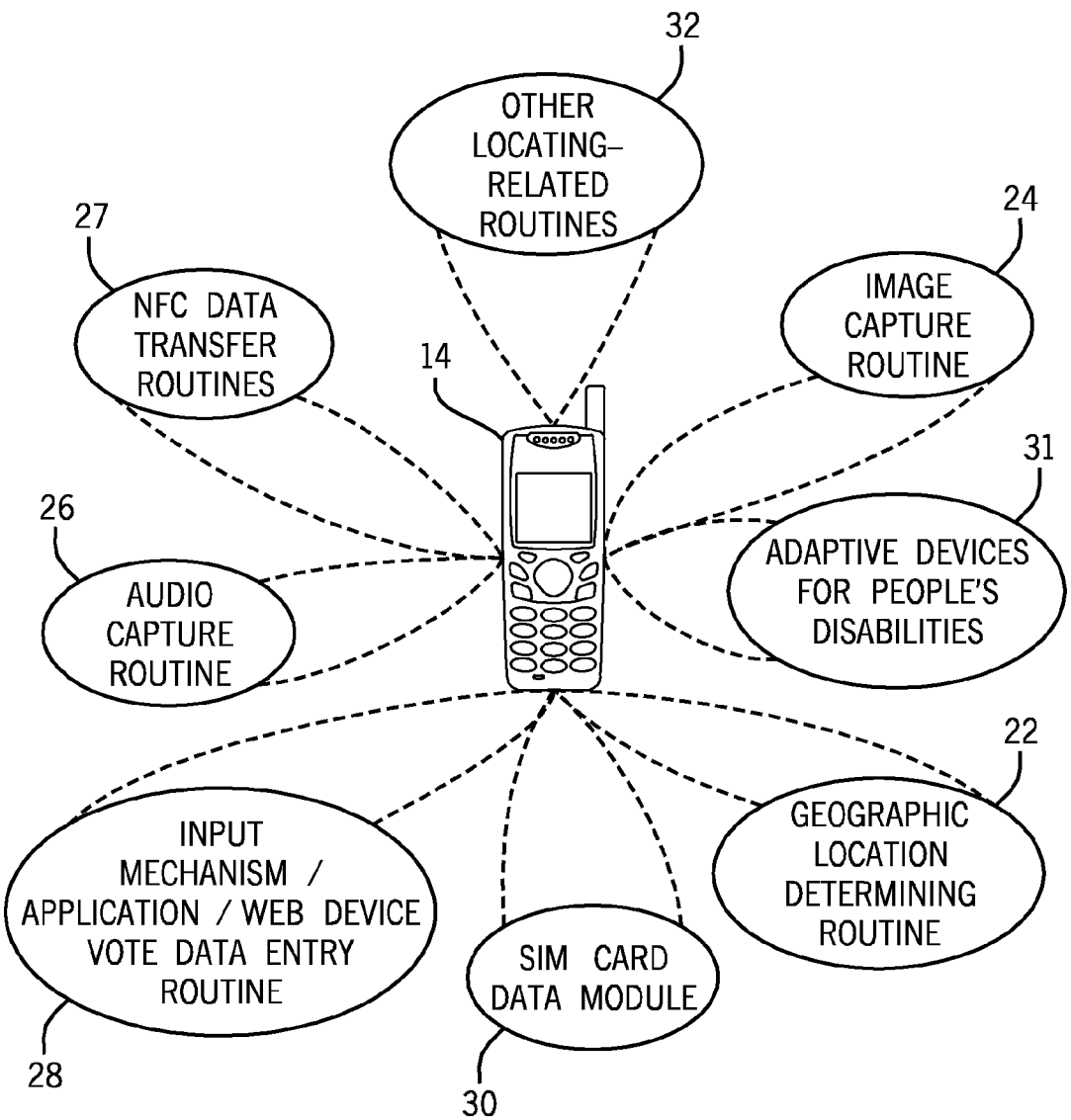
FIG. 3 is a block diagram of the various device routines executed by a wireless consumer communication device that enable the voting authentication method and provide voters in general with a consumer internet enabled device method and in particular, to provide computer implemented routines to assist those voters with disabilities.

FIG. 3 provides a block diagram of various voting access and method routines that may be executed on the targeted wireless communication device 14 in response to detection of and after confirmation of cell tower triangulation latitude and longitude data coordinates received communication data packet. As shown, in FIG. 2, the targeted wireless communication device includes adaptive devices for people's disabilities 31 and may be operable to execute a geographic location determining routine 22, such as a Global Positioning System (GPS) location determining routine, an image capture routine 24 and/or an audio capture routine 26 in cases where a voter is blind and requires assistance in the form of text to speech translation on the device with audio capture routine 26. Additional routines by NFC data transfer 27 routines, other locating related routines 32, including A-GPS, input application device vote data entry routine 28 so voter may select an vote entry and/or multiple entries of vote selections on the device 14 and SIM card data module 30 to perform voting applications by integrating the data and computing tools from the SIM card module. The results of these routines, geographic location data, image data and/or audio data may then be communicated back to the user/owner via a web interface, a network entity, such as a physical voter polling location or provider, the administrator or voting authority conducting the vote and/or any other relevant entity for analysis. Geographic location data 22 and 32 provides the ability to confirm the cell tower triangulation geolocation of the device at time of voting.

Figure 4:
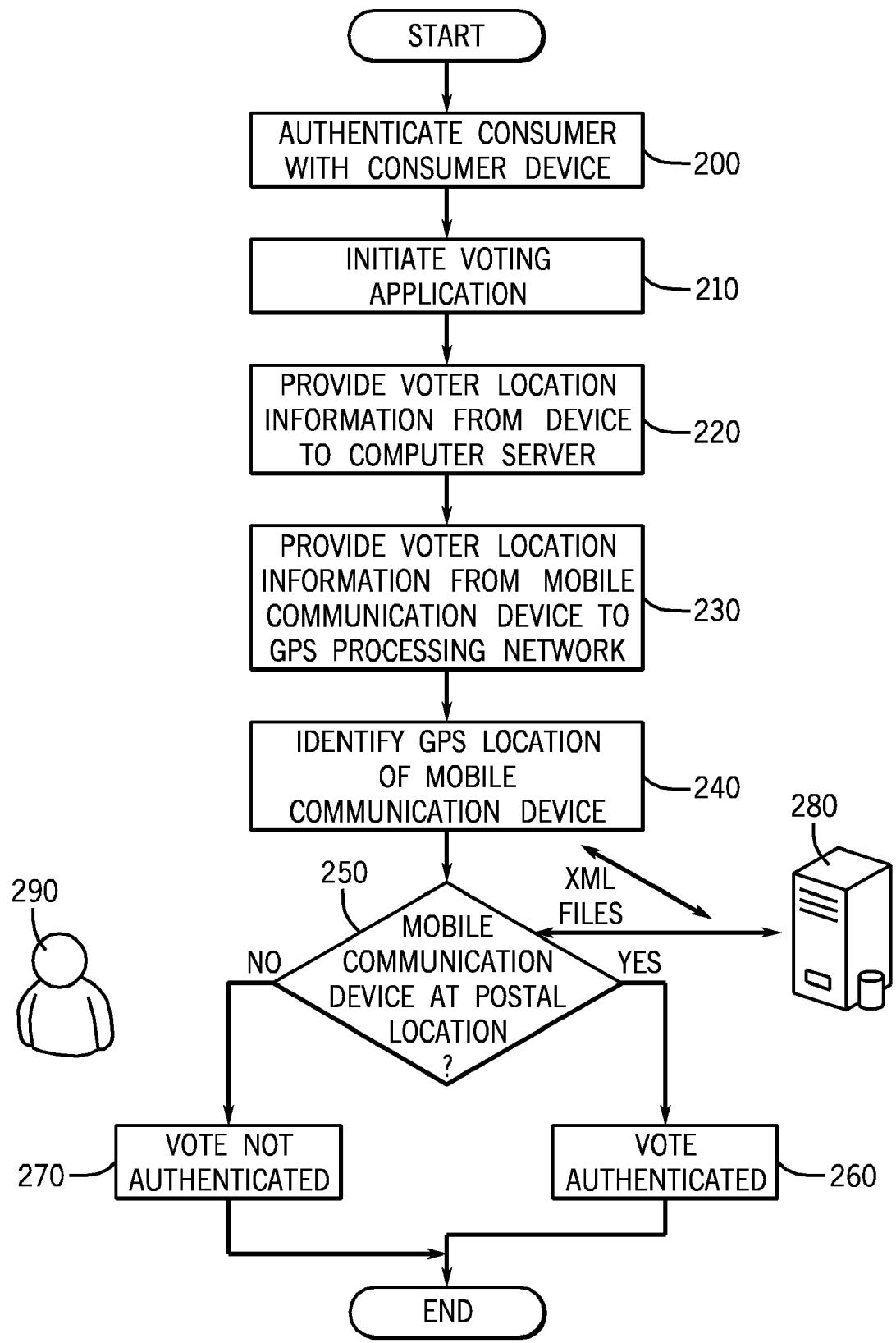
FIG. 4 is a flow diagram illustrating the location-based authentication method for denying authentication of a mobile communication device and a vote processing event based on GPS information reported by the individual voter using a consumer device in accordance with embodiments of the present invention to perform according to an aspect. The diagram distinguishes from prior art by authenticating a voter with a consumer device at a specific postal location registered and stored in a matching remote computer data server to identify cell tower geolocation of the device and to authenticate or deny a vote after initiating a voting application on the device.

FIG. 4 is a flow diagram illustrating a method for authenticating a mobile communication device based on locations of the mobile communication device and a voter where the voter is intending to enter vote selections using the consumer device.

Before the voter initiates the voting process, the voter authenticates himself to the mobile communication device (step 200). The consumer may authenticate himself to the mobile communication device in a variety of different ways. Exemplary authentication mechanisms include entering a personal identification number (PIN), entering a challenge response or by any other method of verifying consumer identity to the mobile communication device, including data from a voter registration record that enabled voter to register to vote in advance of a specific vote or ballot vote selection process.

After the voter authenticates himself to the mobile communication device, the mobile communication device or a SIM card is used to initiate the casting of a vote application (step 210) at the home Postal Service mailing address GPS coordinates or other conforming GPS Postal Service mailing address GPS location or range from that location. Permission or authentication to vote may also be dependent upon time or date parameters of the voting system, and the like stored in a rules and permissions server database and associated with the voter and/or voting process.

The voting authority provides the permissible GPS address location information to the computer server (step 220) where it is stored for matching by exact location or range within (i.e., permitted location may be within 2 miles radius of the GPS location address stored in the voter server and related database). The device cell tower triangulation geolocation information may identify the location of the voter at the time of vote or may include alternate GPS address locations such as the GPS coordinates of a polling location where voters can choose to vote with or without a consumer device.

The mobile communication device provides the voter location information to the processing network (step 230). Thus, the processing network may identify the voting location where the vote is being initiated by the mobile communication device.

The location of the mobile communication device is identified using a global positioning system (step 240). The global positioning system provides the cell tower triangulation location of the mobile communication device to the voter database and remote computer server processing network.

A determination is made whether the location of the mobile communication device corresponds to the voter's pre-designated Postal Service mail location (step 250). The vote casting and serving network considers the mobile communication device to be authentic when the voter location corresponds to the cell tower triangulation geolocation (or locations and/or radius there from) of the mobile communication device. For example, when the mobile communication device is identified as being in the same location as the voter's home Postal Service mailing address (i.e., the address matching a driver's license or address at which a voter is typically registered to vote, the voting processing network authenticates the transaction (step 260). Similar matching can be performed at a business address if the vote is for proxy or union vote elections where the home address may not be the relevant GPS location stored in the computer server database.

The vote processing network may determine that the mobile communication device is not authentic when the voter location does not correspond to the Postal Service mailing location of the mobile communication device based on cell tower triangulation geolocationand other data comparisons and matching in a remote computer data server (step 280). For example, when the mobile communication device is identified as being at a different location from the voter home address, the vote processing network does not process the transaction because the transaction is not authentic (step 270). The voter 290 is notified accordingly by email, SMS or on-screen browser message delivered over the internet on the device screen that parameters in rules and permissions database server (step 280), or other GPS data matching to Postal Service mail address do not match with the database server (step 280) and therefore an authenticated vote on the device cannot be made using the consumer device at this time. Authentication processing may then terminate, or may proceed in another manner (e.g., in-person at a designated physical polling location for the vote).

Figure 5:
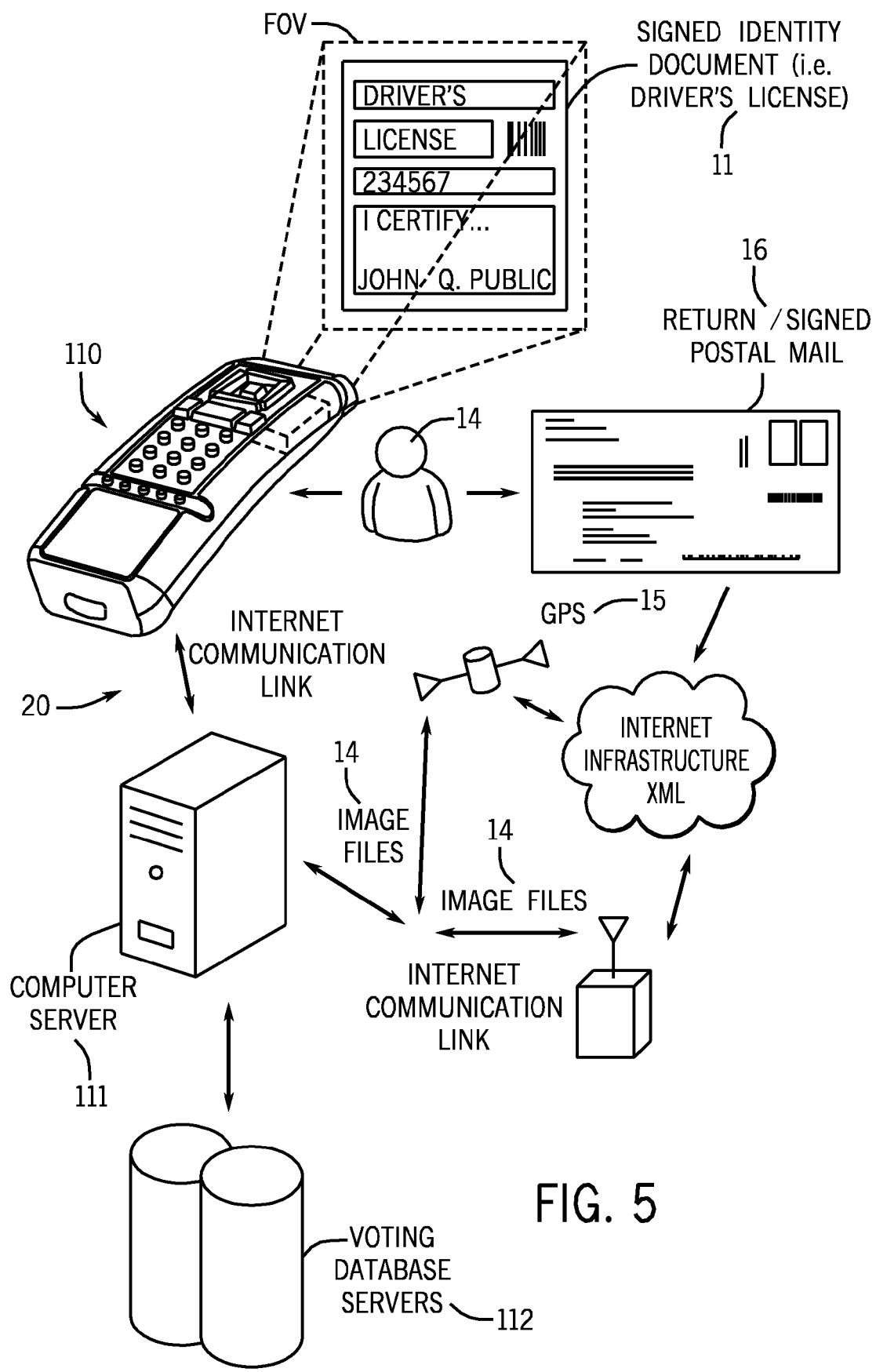
FIG. 5 shows a block diagram of some components of a mobile communication device that may be used as a computer data authentication device to enable voting authentication and processes by using the image capture camera sensor data in combination with the mobile device and a webpage image retrieved from an internet browser screen to process a vote with a printed or an on-screen displayed durable computer-readable medium.

FIG. 5 shows a second illustrative embodiment of the web-enabled voting method of the present invention. As shown, the image sensor device 20 comprises: a mobile image capturing and processing wireless/mobile consumer device 110 for the digital image capture and processing of handwritten signature documents 11, including state driver's license, state ID card, government-issued ID cards, passports and the like, at the point of voting in accordance with the method of the present invention, and transmitting such digital image files 14 (via a wireless communication link) to a remote image data capture computer server 111, and then from the image data capture server 111 to image processing application servers maintained on the voting database server network 112 (via a second web communication link), that can support a handwritten signature voter image application storage and reference database method to further verify and authenticate a voter by the paper-verifiable method for post-election voting audit by comparing paper-based signature records. In alternate embodiments, a separate card can be signed and returned to the voting authority mail to the Postal Service mailing address complete with hand-written signature 16 verification of voting processes and ballots. Alternatively, the image file 13 can access location 15 data from the device 110 to provide cell tower triangulation geo location data together with image files sent over internet infrastructure to computer server 111 and voting database servers 112.

Figure 6:
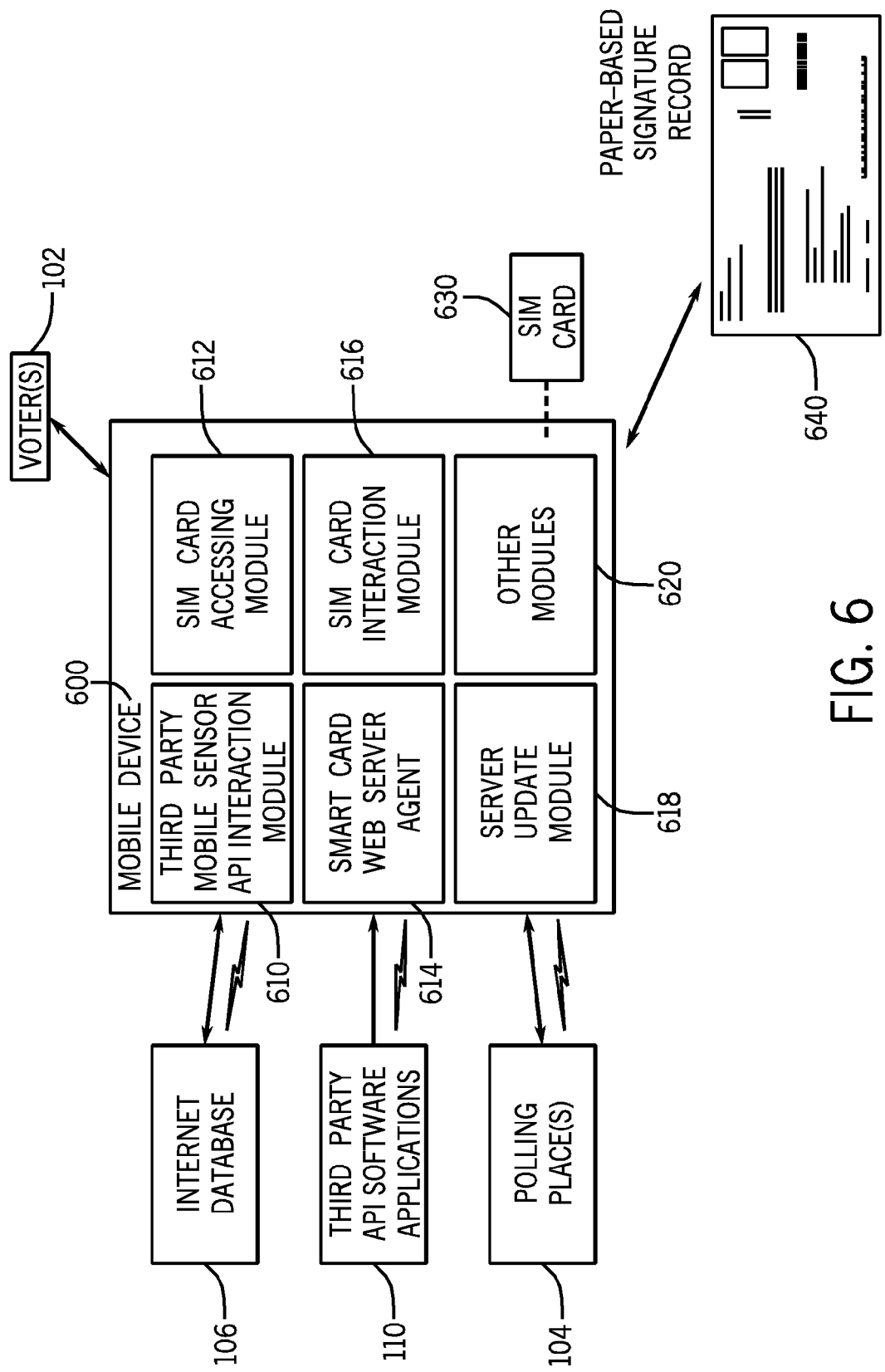
FIG. 6 is an exemplary illustration of various SIM card data module application modules at a mobile device, according to various implementations of the invention.

FIG. 6 According to some implementations of the invention, a portable/removable integrated circuit card (ICC), such as, for example, a Subscriber Identity Module (SIM) card may be utilized for voter and device authentication with the computer-implemented voting method.

According to some implementations of the invention, and with reference to FIG. 6, voter 102 may use a consumer mobile device 600 with a SIM card 630, where the SIM card 630 may implement various features of the computer-implemented voting method. In these implementations, the SIM card 630 may additionally include among other information, the information included in the SIM card described above (for example, voter's registration record identification-related information, voter's Postal Service mail address information, voter's GPS home location latitude and longitude information, voter's International Mobile Equipment Identity (IMEI) data (by using the Provide Local Information code command, and/or other voter or device information). The SIM card 630 may also include the electronic forms associated with fill-in voter ballot download or on-device display screen ballot viewing or vote selection processes.

According to some implementations of the invention, when voter 102 with the mobile device 600 that includes the SIM card 630, visits a polling place 105 for on-premises voting 105 may access the SIM card 630 to obtain the voter information associated with the voter, retrieve electronic forms associated with voter registration or ballot format compliant voter selection forms, and/or other voting information. This may be accomplished via various wired or wireless communications links associated with the mobile device 600 in which the SIM card 630 operates. This may also be accomplished by reading the SIM card 630 directly (e.g., by removing the SIM card 630 from the mobile device 600 and inserting (i.e., "hot swapping" a different SIM card 630 into the device 600 or a reader at the polling place 105. The obtained voter information may be used to generate ballot compliant voting form(s) between a polling place location 105 and voter 106 with SIM card.

In some implementations of the invention, as depicted in FIG. 6, mobile device 600 may be configured to run an application (not shown) stored in a memory at the mobile device 600 comprising one or more JavaCard application modules that may enable various features and functionality of the invention. For example, the one or more software modules 612 may perform functions including one or more of: accessing SIM cards 630, updating voter information on the SIM card and remote server 618, generating voter ballot forms for internet voting on the device, or other functions.

According to various implementations of the invention, these application modules may include one or more of a third-party service Mobile Sensor API software and communication interaction module 610, SIM card accessing module 612, device identity generating module 614, SIM card interaction module 616, server update module 618, or other modules 620.

According to some implementations of the invention, voter 102 may utilize the mobile device 600 to connect to third-party service API software and communication application 110 and generate requests to obtain the initial voter information provided at either a polling place 106, or voter's home Postal Service Mail address reported by GPS coordinates 108, or both to third-party service API software 110, via third-party service API software application interaction module 610. Any suitable wireless communication links may be used to connect the mobile device 600 to third-party service API software application 110. Third-party service API software application 110 may receive the requests for initial voter information and in response may retrieve the initial voter information from internet database 106, and provide the retrieved information to voter's 102 mobile device 600. Third-party service API software application interaction module 610 may receive the initial voter information from third-party service API software application 110 and store obtained voter information data, ballot or API 610 in the SIM card 630 included in the mobile device 600.

In this diagram, we have a Smartphone 600 consumer device handset connected to the internet by a web-based browser capable to receive any HTTP/HTTPS and html internet database 106 content for viewing on a consumer device. The method provides a novel approach is to use a Smart Card Web Server from the SIM toolkit for voting by putting those HTTP/HTTPS and html web pages on the SIM card 630. According to this implementation, the SIM card can store specific content related to vote or voting with the consumer device handset can support the implementation. So instead of sending on the handset a website from a URL request in the device's browser, the webpage action is performed by an agent 614 receiving the HTML/HTTPS content from the SIM card. So the request to initiate a vote is sent to the SIM card by the voter using the device and the SIM card fetches the appropriate contents from the internet. Included with this inventive method is data provided by SIM based services with pictures, midlets, files, everything already deployed on web browser. The HTTP/HTTPS voter related content is assembled and resolved by the SIM card 630, not the web browser program.

In some implementations of the invention, third-party service API software application interaction module 610 may provide voter's 102 updates (additions, deletions, changes, and/or other updates) to the initial voter information in SIM card 630 to the third-party service API software application 110. Third-party service API software application interaction module 610 may provide updates associated with voter's chosen API software applications 110, voter identity-related information associated with voter 102, and/or other voter information. The SIM card implements the interaction using a SIM card programming software method known as Smart Card Sever Interaction using SCWS technology. The application may be via Over the Air (OTA) by using the SIM Alliance loader. Further, the SIM card IMEI is read by using the Provide Local Information (ETSI TS 102 223) command and user typically needs a PIN or password to download software to the SIM card. Gemalto® is one of the manufactures of a SIM card that uses Smart Card Web Server technology to implement mobile applications such as voting in the SIM card with SCWS technology. A SCWS-compatible handset and SIM card also enables deployment of secure services with standard Web technology by leveraging inherent smart card security features making them especially beneficial for a voter application using an internet method.

In some implementations of the invention, voter 102 may update the voter information, for example, voter identity and registration related information, and/or other information, included in the SIM card 630 by directly entering the updated information using the mobile device's data entry screen or other integrated data entry keyboard. This updated information may be directly communicated to third-party service API software application 110 via third-party service API software application interaction module 610. In some implementations, the updated information may be communicated by a PC which in turn may communicate the updated information to third-party service API software application 110. Third-party service API software application 110 may receive and store the updated voter information in database 106 or in device server update module 618. In some implementations, the updated voter information from the voter may be received and stored in the SIM card 630 via SIM card interaction module 616.

In some implementations of the invention, voter information may be maintained at the voter's PC and may be synchronized with the voter information on the SIM card 630. Voter 102 may update the voter information maintained at the voter's PC. The updated voter information may be downloaded from the PC onto the SIM card 630. Then, the updated voter information may be communicated to third-party service API software application 110 by the mobile device 600.

In some implementations, updated voter information from third-party service API software application 110 (which may include updates from other entities, for example, API software applications 110, voter 102, and/or other entities) may be received and stored on the SIM card 630 of the mobile device 600 via the third-party service API software application interaction module 610. In some implementations, the updated voter information from third-party service API software application 110 may be received by the consumer device. The obtained voter information may be downloaded from the consumer device and stored in the SIM card 630 included in the mobile device 600.

In some implementations of the invention, third-party service API software application 110 may comprise corresponding voter interaction modules (that may enable third-party service API software applications 110 to receive requests to obtain voter information from the mobile device, retrieve and provide the requested voter information to the mobile device 600, receive updates to the voter information from the mobile device 618, provide updates to the voter information to the mobile device, receive requests to view voter information from the mobile device, provide the views of voter information to the mobile device, and/or other functions.

According to some implementations of the invention, the mobile device 600 may comprise a SIM card accessing module 612 that may access the SIM card 630 to obtain the voter information, including the electronic ballot form(s) associated with voting process, and/or other information.

In some implementations of the invention, API software application 105 may update the voter information directly at the remote server 618 associated with third-party service API software application 110 via server update module 618. In some implementations, a voter polling place 105 may update the voter information by synchronizing updates to voter information on the SIM card 630 with voter information at the remote server accessed by internet database (for example, if a person with a disability needs assistance at the polling place to vote using the mobile device with assistive technology tools).

In some implementations, the mobile device 600 may comprise a server update module 618 similar to the server update module 618 of API software application 610. In some implementations, the server update module 618 may update the voter information at the remote server and synchronize the voter information, including cell tower triangulation geolocation coordinate data, on the SIM card 630 with the voter information at the remote internet database server 106.

In some implementations of the invention, the application described with respect to FIG. 6 may be resident on the SIM card 630 and mobile device 600 may be configured to run the application resident on SIM card 630. The application and the voter information may be stored in separate areas of the SIM card.

In some implementations of the invention, the SIM card can be removed from the consumer device after a voting process and sent by Postal Service mail 640 to a voting authority or vote administrator, including a handwritten signature method with legal declaration 640 to certify and attest to the voting process using the internet database 106 and mobile device. In such case, the SIM card may be returned together with a signature card or other paper-based form that serves as a paper-verifiable record of the vote and also a means to audit the vote electronically from the SIM card included in a pocket of the return Postal Service mail 640 data if needed to supplement or re-affirm an internet based vote from the device to better enable a post-election audit verification process or response to resolve a vote authentication challenge.

Figure 7:
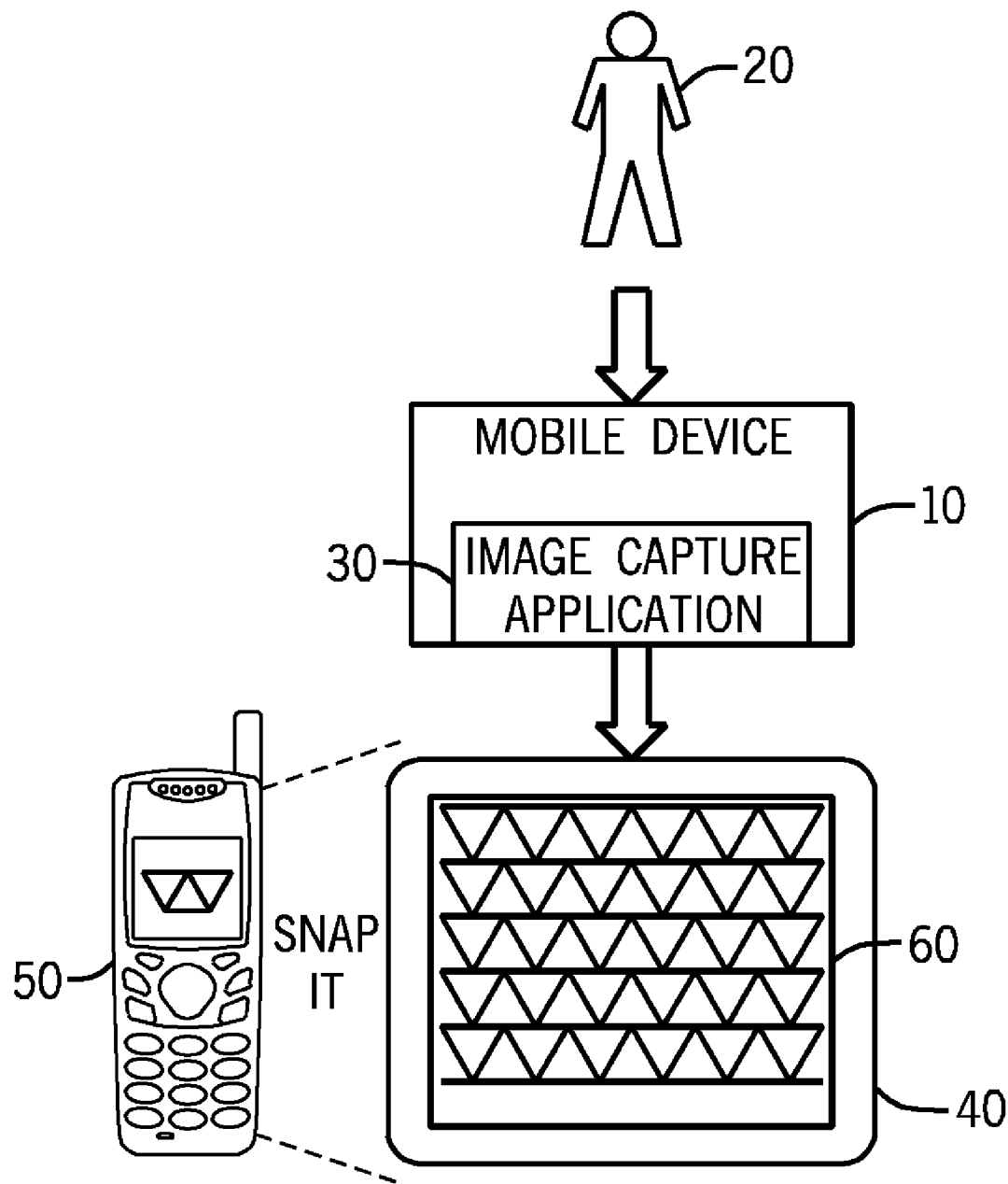
FIG. 7 shows a consumer device configured to scan a Microsoft® Tag for use in internet voting with an image capture application on the mobile consumer device, under an embodiment.

FIGS. 7-10 shows a process flow for an individual voter with a consumer device configured to scan a Microsoft® Tag for use in a internet-based voting application from consumer device targeting and capturing a digital image of the Tag displayed on a computer screen monitor, when such monitor receives voting content at a designated IP address or URL, under an embodiment;

FIG. 7 shows a consumer device configured to digitally capture a Microsoft® Tag image 60, under an embodiment. The consumer (i.e., mobile) device 10 is operated by a voter 20 and includes and processes all applications corresponding to Microsoft® Tag 60 data recognition activities. These applications include image capture camera application 30 (e.g., by active-pixel sensor) using consumer device 50 camera application for scanning (or to "Snap It") application using one or more Microsoft.Tag(s) displayed over the internet onto a computer screen 40 displaying Microsoft.Tag 60, but the applications are not so limited.

In an embodiment, Microsoft® Tag 60 recognition processing is performed via a consumer device coupled to a server via a network to provide interactive voting by the consumer device in combination with a separate PC, and related PC display monitor screen 40, displaying the image(s) of a Microsoft® Tag for voter capture and selection using the separate mobile consumer device. In these embodiments, voters use local processing devices (e.g., consumer devices) to communicate via one or more networks (e.g., Internet, wireless networks, wired networks, etc.) with a server supporting Microsoft® Tag recognition activities and exercises.

Figure 8:
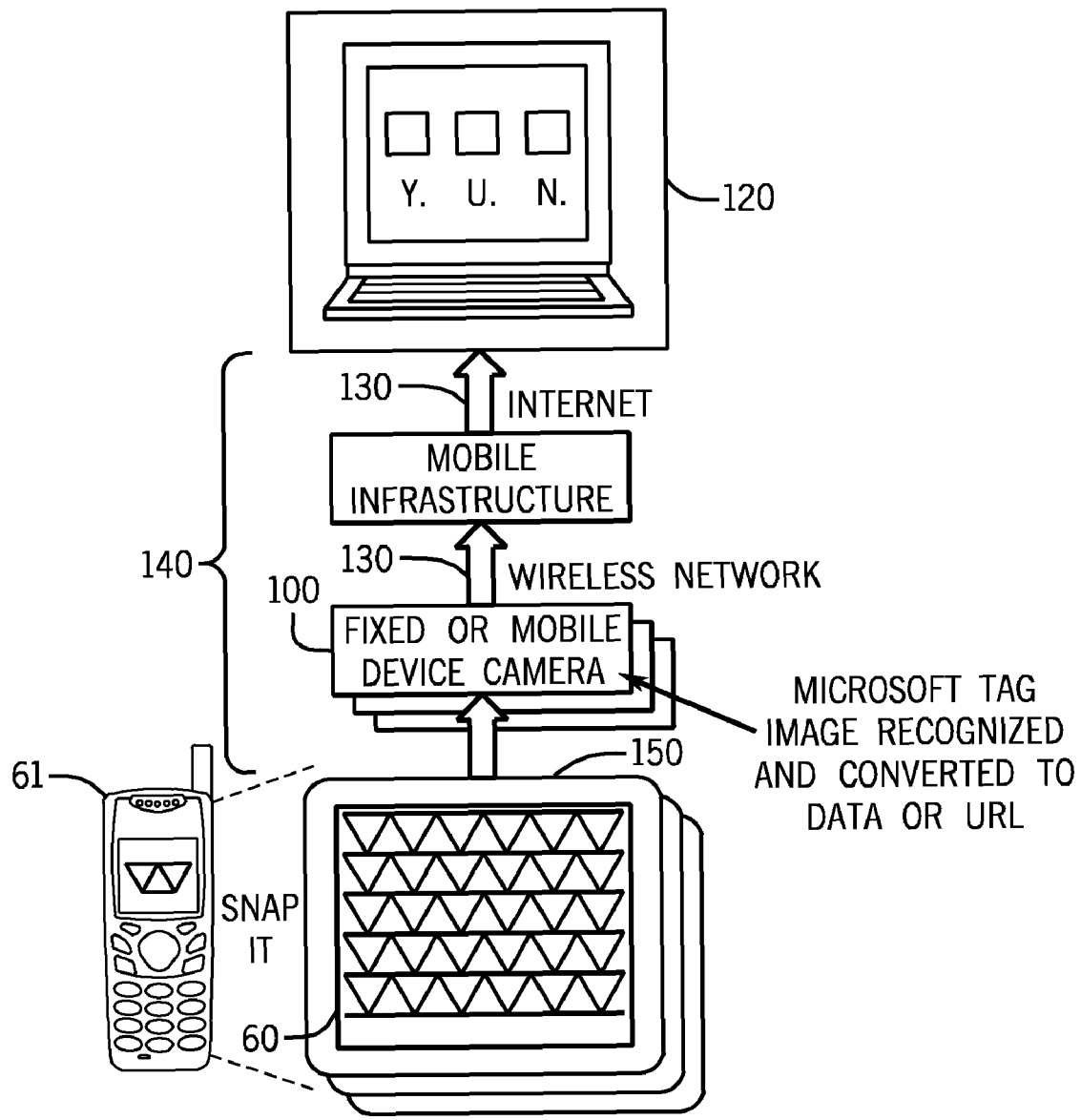
FIG. 8 is a block diagram of a method supporting the durable computer-readable identifier of the Microsoft® Tag image capture and recognition processing between a consumer device and a server via a network coupling in a PC based application where the tag images are displayed on a PC screen for capture and wireless transmission, under an embodiment.

FIG. 8 is a block diagram of a system supporting Microsoft® Tag 60 recognition processing between a consumer device 61 and a server via a network coupling, under an embodiment. The system includes a server network 140 supporting Microsoft® Tag recognition. The network 140 includes, for example, a mobile infrastructure 130 comprising a consumer device 100 coupled or connected to one or more of wired networks, wireless networks, the Internet, and other network types 130 over which communication can occur. Numerous voters using a fixed or mobile device camera 100 can each communicate with a an electronic PC screen display 120 supporting Microsoft® Tag recognition services via the network server environment 140, for example. In an embodiment, a voter 100 is using a mobile phone, personal digital assistant, personal computer, work station, or other device capable of scanning Microsoft® Tags via a durable computer-readable identifier in the form of a Microsoft® Tag(s) 60 by a voter using the consumer device 61 with fixed or mobile camera device and communicating via the network 140, but is not so limited.

In a further alternate embodiment, a voter uses the device's camera to scan the Microsoft® Tag 60 for digital recognition for interactive voting, over the mobile infrastructure 130, with software applications that support the processing of Microsoft® Tags that can request that the software for reading the Microsoft.Tag 60 be downloaded or otherwise served from a remote computer server request on the PC device 120 and installed to the voter's consumer device 61 at the time a voter subscribes to the internet voting method. These downloaded applications are subsequently run on the consumer device 61 during the execution of the Microsoft® Tag recognition and associated vote selection process.

When a voter operating the voter wishes to communicate with the server for Microsoft® Tag recognition activities, the voter scans the Microsoft® Tag of the VoterTags® or electronic display 150 of one or more Microsoft® Tags and transfers the displayed Microsoft® Tag(s), or causes the Microsoft® Tag to be transferred, to the server by PC device 120 that supports Microsoft® Tag recognition software application and download processing. A browser running on the consumer device 100 will establish a coupling or connection to the mobile wireless network infrastructure 130 (e.g., a W-CDMA, Transmission Control Protocol/Internet Protocol (TCP/IP) coupling or connection).

Information and messages are broken down into smaller pieces, or packets, to be transmitted from a source to a destination. The protocol breaks down and reassembles the packets, while ensuring the packets are transmitted to the proper destination. Each packet is given a header that contains a variety of information, including the order in which the packet is to be reassembled with other packets for the same transmitted message or information. Each packet is put into a separate IP envelope for transmission over the internet 130. The IP envelopes contain addressing information that direct the internet 130 to IP data or URL destination address. All IP envelopes containing packets for the same transmitted message or information have the same addressing information, in order that they are all transmitted to the same destination location, and thereafter, properly reassembled. Each IP envelope also contains a header that includes information such as the source, or voter's Postal Service mail, address, the date and time of the vote, and the amount of time the packet should be maintained before being discarded, etc.

In an embodiment of a Microsoft® Tag recognition activity for interactive voting, a voter requests, via their PC device 120 with display screen or consumer device 61, an XML (eXtensible Markup Language) file comprising a web page for use in a Microsoft® Tag function. The Microsoft® Tag function of an embodiment includes a Microsoft® Tag processing exercise from the server supporting Microsoft® Tag recognition. The Microsoft® Tag function of an embodiment also includes use of the URL from the decoded Microsoft® Tag to return a multimedia object or web page to the consumer. The proper XML file is returned to the consumer from the server, via the Internet or wireless network, and the consumer's browser displays the text, graphics and multimedia data of the file on the PC device 120 consumer's screen. The voter may then perform various vote or voter registration or voting processes at the direction of the displayed web page.

In order to support Microsoft® Tag recognition processing for interactive voting via the Internet or wireless network, a voter accesses the Microsoft® Tag recognition program on the device or a server, which may or may not be remotely located from the consumer. The voter then scans the Microsoft® Tag using the consumer device and in response to the scanning, receives a response or feedback from the server. Responsive feedback from the Microsoft® Tag recognition program may be in the form of text, graphics, audio, audio/visual, or some combination of these but is not so limited.

As described above with reference to FIG. 8, in an internet server network 140 supporting Microsoft® Tag recognition, numerous voters 100 with fixed or mobile device camera are configured to communicate with a PC device 120 and server supporting Microsoft® Tag identifier recognition services, e.g., for voting via the Internet or wireless network 130. In an embodiment, in order to support Microsoft® Tag recognition processing for respective voters 100, the server 120 executes a Microsoft® Tag processing thread.

Figure 9:
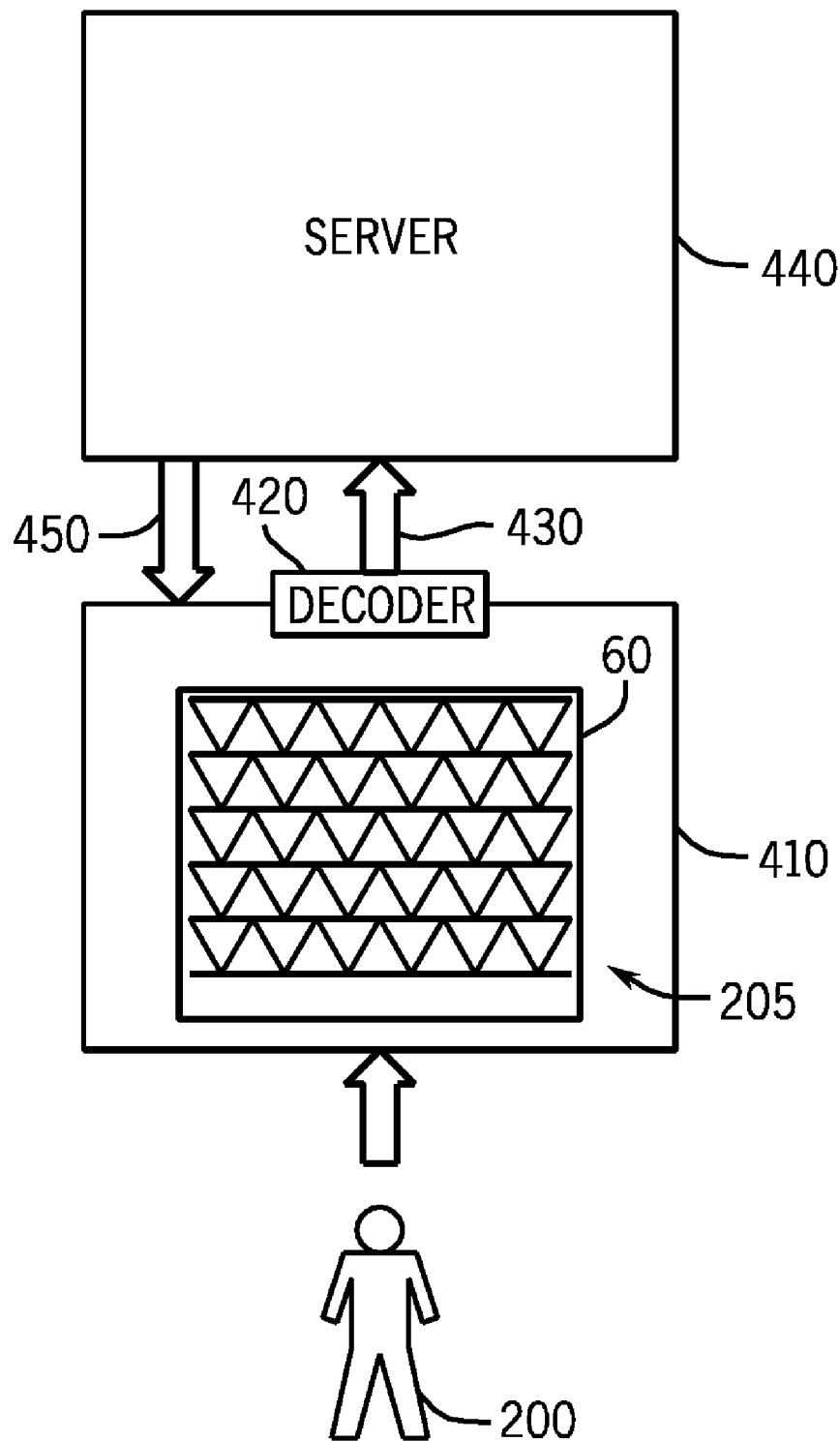
FIG. 9 shows transmission of a Microsoft® Tag to a server for processing in interactive voting applications over the internet and mobile device, under an embodiment.

FIG. 9 shows transmission of Microsoft® Tag data to a server for processing in interactive internet voting applications, under an embodiment. An embodiment of Microsoft® Tag recognition processing for interactive voting begins when a voter 200 scans a Microsoft® Tag 60 using his/her consumer device. The Microsoft® Tag includes information or indications of a command for a location on the web or a server that the voter wishes to access. The consumer device decoder 420 sends the Microsoft® Tag captured image data request to the server supporting the Microsoft® Tag processing application and the URL from the decoded Microsoft® Tag 430 via the network.

In response to transmission of the Microsoft® Tag by the voter, the voter receives an XML file 450 comprising a web page from the server for use in an internet-based vote activity, and the consumer device 205 displays the text, graphics and multimedia data of the file to the voter 200. When the voter thereafter selects a Microsoft® Tag via the displayed web page, a script associated with the selected exercise activates a browser component.

In an embodiment, a text response is returned to the voter from the server, which is displayed on a portion of the screen already displaying the current web page for the activity accessed by the voter. In an alternative embodiment, an entirely new XML page 450 is returned from the server 440, which is displayed as a new web page to the voter, via the consumer screen on the mobile device 410.

Generally, the Microsoft® Tag processing thread is configured to accept Microsoft® Tag data packets from a consumer, decode the Microsoft® Tag 60, and transmit a response, or appropriate feedback to the voter. The Microsoft® Tag processing thread is configured to perform each of these functions as the appropriate data becomes available to it, thereby eliminating any latencies that normally accrue when each of these functions is performed in a pipeline function, wherein processing of one function is required to complete before beginning other processing tasks.

Figure 10:
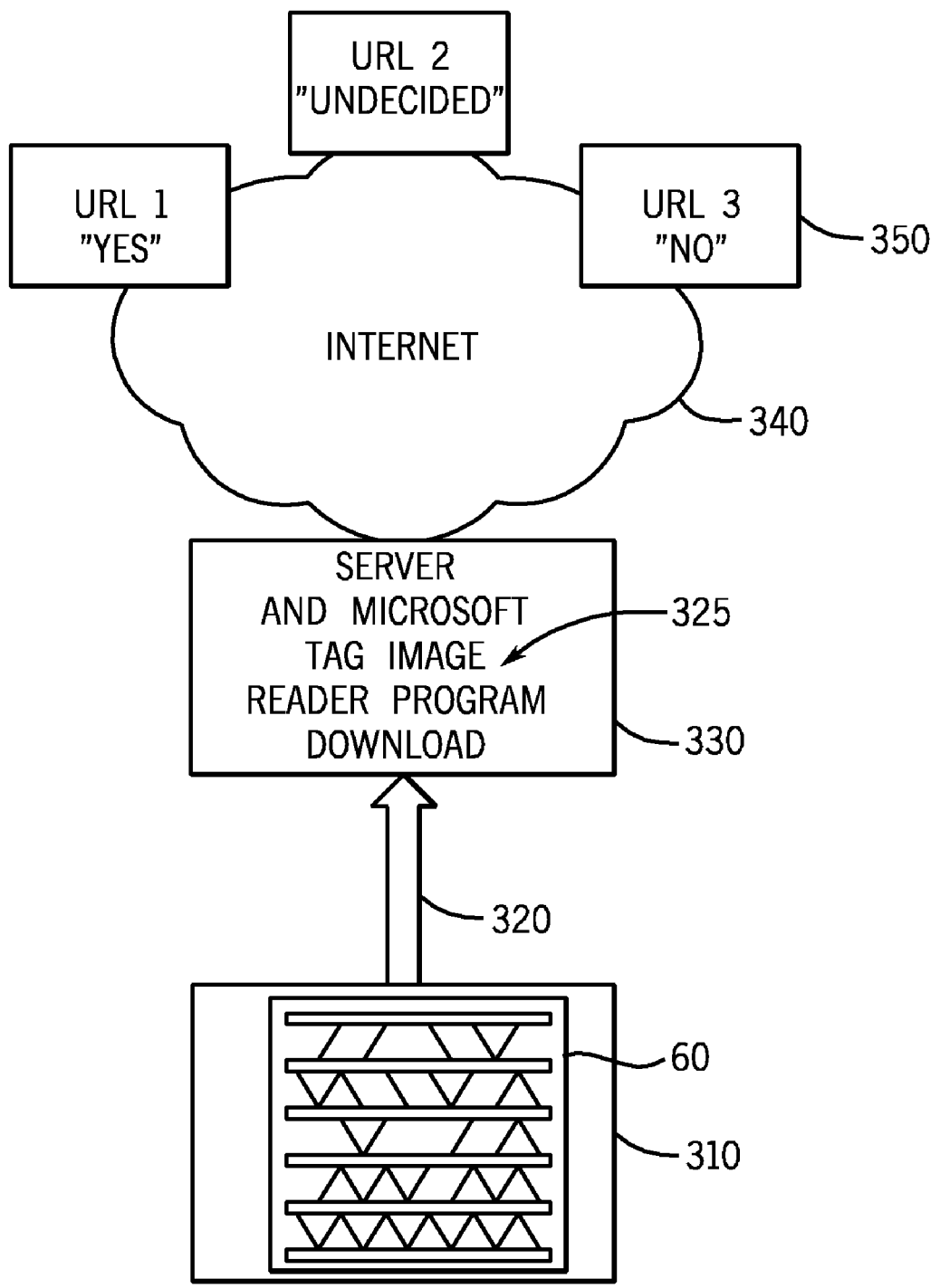
FIG. 10 shows connection to URLs via a decoded Microsoft® Tag in interactive voting applications over the internet and mobile device, voting under an embodiment.

FIG. 10 shows connection to URLs via a decoded Microsoft® Tag in interactive voting applications, under an embodiment. A Microsoft® Tag received by a consumer device is decoded 320 and transferred to a server where it is processed or analyzed by voting application (e.g., election ballot XLM processing and URL application), or interactive API software voting application. The application communicates through the network (e.g., internet 340) to access and exchange information with URLs 350 hosting a variety of vote selection and specific ballot vote selection content choice options. In an embodiment of a Microsoft® Tag processing thread 320, a coupling or connection (e.g., TCP/IP connection) is established for a voter 310 wishing to access the server 330. In response to the voter scanning a Microsoft® Tag 60 with the consumer 310, a consumer browser component is activated after server and Microsoft® Tag image reader program has been downloaded 325 or otherwise previously installed onto the consumer device, and the consumer device browser initiates and establishes the connection with the server. The connection established with the server includes connection or direction to a particular exercise or vote selection recording in the server 330 corresponding to the scanned Microsoft® Tag.

The URL 350 associated with one or more Microsoft® Tag 60 can represent one or more vote selections on a topic for voting representing a "Yes," "No," "Undecided," or similar vote selection option such as the name of a candidate running for board of director, union leadership council, television performer, teacher of the year competition, etc.

Figure 11:
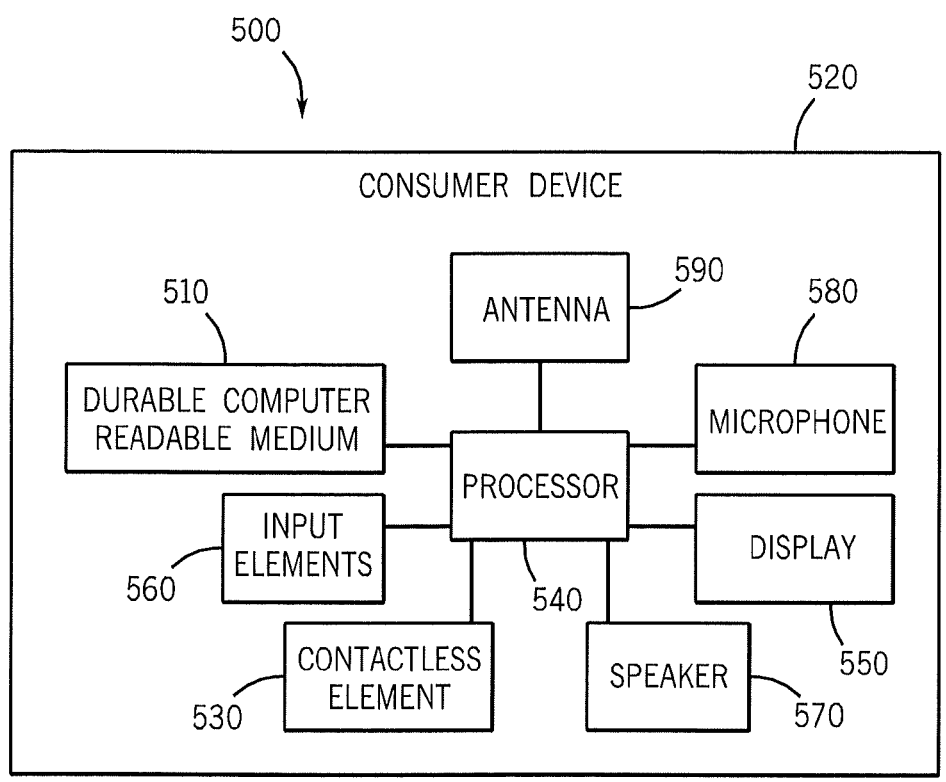
FIG. 11 shows a block diagram of alternative data sensor components in a consumer device that may be used to read a durable computer-readable identifier in the form of a Near-Field communication ("NFC") tag or label.

FIG. 11 shows a block diagram of some components of a mobile communication device 500. The mobile communication device 500 may comprise a durable computer readable medium 510 and a consumer device 520. In this alternate embodiment, the computer readable medium 510 may be a Near-field communication ("NFC") tag, an alternate form of a durable computer-readable identifier that stores data and may be in any suitable form including a label or tag.

The mobile communication device 500 may further include a contactless element 530, that is typically implemented in the form of a semiconductor chip (or other data storage element) with an associated wireless transfer (e.g., data transmission) element, such as an antenna. Data or control instructions transmitted via a mobile communications carrier network may be applied to the contactless element 530 by a contactless element interface (not shown). The contactless element interface functions to permit the exchange of data and/or control instructions between the mobile device circuitry (and hence the mobile network) and the contactless element 530. For reference, the NFC mobile reading circuit can be included with the SIM card described in FIG. 6.

The contactless element 530 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange voter data between the mobile communication device 500, or it can be used to exchange voter data between the mobile communication device 500 and the polling place location noted by reference 105 in FIG. 6. Thus, the mobile communication device 500 is capable of communicating and transferring voter ballot data and/or voter authentication instructions via both mobile carrier network (i.e., Verizon® or T-Mobile® wireless) and near field communications capability.

The mobile communication device 500 may also include a processor 540 (e.g., a microprocessor) for processing the functions of the mobile communication device 500 and a display 550 to allow the consumer to view voter ballot associated with voting that may be selected and other voter information and messages. The mobile communication device 500 may further include input elements 560 to allow a voter to input information into the mobile communication device 500, a speaker 570 to allow the voter to hear voice communication, text-to-speech reading of the ballot contents, etc., and a microphone 580 to allow the voter to transmit voice through the mobile communication device 500 to vote in the event they have a disability and require such assistance to vote. The mobile communication device 500 may also include an antenna 590 for wireless data transfer (e.g., data transmission) over the internet.

A method for voters to use a consumer device such as a mobile communication device or a mobile phone to authenticate themselves and vote just as they would in a polling place for a local, state or national election event in the voter's home jurisdiction. The computer-based method also keeps a handwritten signature paper data record, verifiable by the voter with the voter's handwritten signature to confirm they voted by the internet method, which is sent back using Postal Service mail to voting authority, voting officials, or otherwise deposited by voter at a physical voter polling location after the elections have been made on the device, enabling a post-election audit with a paper-verifiable record. The method applies data captured and sent wirelessly by the device applying data from data sensors such as location data, and an active-pixel sensor (APS) camera image capture of a durable computer readable medium, to create a new trustworthy voting method by consumer device with a paper-verifiable trail across the internet.

The availability of small, low-cost, and low-power CMOS image data sensors with active-pixel sensor, GPS receiver chipsets, portable consumer device mobile phones, and internet database servers that can be accessed wirelessly over wireless mobile network carriers combine to create a method to enable new consumer device and mobile voting methods. As a result, different computer applications and methods have emerged that work with a mobile communication device and their related software application program interfaces (APIs) and user device interaction that enable the instant method of voting with trustworthy voter authentication.

The current invention is directed to novel cyber-physical methods for voter and election related database verification services, image data capture and reporting, and location sensor data to include online communications and database reporting services that link to and run in parallel with physical Postal Service sent mail to verify and permit a trustworthy voting process to be performed by computer server methods over the internet using a consumer device.

The method, in part, performs a mobile device voter process accessible to a wider range of voters, including those with disabilities who cannot easily visit physical polling locations, to enable what is in essence a new mobile device authentication and internet transmission method for what is often referred to as an absentee ballot voting process.

The new method helps transform voting for people with or without disabilities by combining the security and trust of Postal Service mail with the convenience of a mobile device. The method helps transform a mobile phone or Smartphone into a trustworthy electronic voting device that can be used at to vote at a Postal Service home mailing address or at other designated physical location(s) to authenticate the consumer device and voter and then process a vote in an election event or any other voting process from the device including a shareholder proxy votes, school board election, university student officer election, or popularity selections for a survey to select entertainers such as singers or other TV performers.

The technological and administrative solutions of the instant method are designed to help ensure that all citizens can vote privately and independently, a requirement of the Help America Vote Act (HAVA) of 2002 (42 U.S.C. §15441). The technology leads to the adoption of a new method to make voting systems (including paper ballots) more accessible to all voters and make the entire election process more welcoming and accessible to individuals with disabilities by allowing voting to take place at a home residence or designated polling location as verified, in part, by cell tower triangulation geolocation data in a consumer device and compared to a physical Postal Service mail address by a computer server database.

The method is further enabled by GPS location coordinate data that can be made readily accessible to a consumer device over wireless access using mobile communication consumer data network carriers and application program interfaces (APIs), and SIM card-based Smart Card Web Server using internet connected consumer devices. Providers of cell tower triangulation geolocation data that can be integrated to perform access by internet database lookup and reporting by the instant method include companies such as Navteq®, Alcatel-Lucent®, deCarta® and Tele Atlas® that provide server-side wireless mobile geospatial software solutions to help power the location reporting and analysis functions of the instant method with an efficient client/server architecture and programming interface using a J2ME API mobile platform with GPS and related latitude and longitude data for computer database lookup, comparison and analytic reporting capabilities.

The cell tower triangulation data enables a process known as geolocation, also called geotagging or geocode that is the practice of associating a digital resource with a physical location. Location information is typically given in terms of latitude and longitude coordinates, which can pinpoint any place on the planet with a high degree of precision.

Other sorts of digital artifacts—such as sent Postal Service mail in the form voter election information similarly benefit from being included with a durable computer readable medium affixed or included on voter mail that can be further verified by comparison to cell tower triangulation with location data. With cell tower triangulation geolocation data coordinate layers of information, voting authorities have new abilities to discern correlations between related materials, and take greater advantage of the growing interconnectedness of consumer computing devices and Mobile Sensor API application methods for device and voter authentication. The cell tower triangulation geolocation data for voting methods creates a new and improved verification tool for voting on a mobile consumer device when captured by a Mobile Sensor API (Application Program Interface).

A Mobile Sensor API allows Java ME and other software applications to fetch data easily and uniformly from the sensor(s). An API offers a unified way of managing sensors, connected to the mobile devices, and access to the sensor data. A sensor is any measurement data source. Sensors are of different types. These can include: GPS, active-pixel sensor (API) using a CMOS camera module that is can capture sensor data in the form of an image in a camera type CMOS device, and physical sensors such as magnetometers and altimeters.

A Mobile Sensor API provides for sensor detection, sensor connection, fetching data, processing data, push support, and access permissions. A sensor in a mobile device may be connected to an application program for voting by API, SIM card or a downloadable software program based on a general specification focused on communicating with the sensors that are integrated on a mobile device generally a Java ME device or a device with JavaCard SIM device. It can be any type of sensor, including an RFID or Near-field communication (NFC) computer readable medium in the form of an electronic tag reading sensor, a durable computer readable medium, an active-pixel sensor or, a GPS data sensor. It is also feasible to for a device owner to send an SMS message, including the current location coordinates of the device. However, SMS will almost certainly be more complex and error prone than simply making a data connection to a computer database server and sending the information directly (e.g. by using an HTTP connection and posting the data).

The main functionality of Mobile Sensor API is to fetch sensor data and monitor it based on set conditions. The appropriate sensor has to be found or known beforehand in order to use. An application can search for a desired sensor based on an application such as in this case, to process to enable voting using the mobile device with cell tower triangulation or other sensor(s) under the method for voter registration or vote processing. The device registers itself as an application program associated with the sensor(s) and stores the values in different integers reflecting latitude and longitude coordinates. There is also a constant storing of a URL to the sensor. This URL is specific to the geolocation in various devices such as in the HTC, Samsung® and Sony Ericsson® consumer device phones.

Some sensors are intended for restricted use only, to be used or controlled in the manufacturer, mobile carrier network operator, or trusted party domain applications only, or if the user permits. When the application does not have the required permissions, all the found sensors are still returned but they cannot necessary be opened. Security and permissions for some methods in a voting based sensor data API can be performed if the user does not have the permissions needed to perform the action. This device, device user and application (s) from a web server can specify various permissions to restrict or automatically the usage of some sensors.

In addition to Mobile Sensor API applications, the method takes advantage of newer global positioning data sensor and reporting systems on mobile devices to allow voters to include a precise location with each vote made on the phone together with other technology tools, in combination, that include: Near-field Communication (NFC) and SIM card identity tools and Postal Service mail. Voting authorities would be able to set rules and permissions from the data reported by the device and the data sensors therein to determine whether to accept votes from a particular device, person or location and on particular dates and times.

Geolocation voting methods can help create worldwide standards for voting authentication and verification. The data sensor method may also rely on other data in the device to provide cell tower triangulation geolocation (also known as "A-GPS" or Assisted-GPS), reverse geocoding for address linking as options when a GPS sensor is not included in a device. Such wireless operator network cell sector and cell tower solution are especially useful with older consumer device that may not have the latest GPS data sensor chipset inside and therefore must rely on cell tower triangulation techniques for geolocation data under the method.

Beyond GPS based address location data coordinates, the Postal Service mailing address data of the method can be implemented with a durable computer readable medium corresponding to the physical postal mailing address or the equivalent. Accordingly, an alternate method to supplement captured image data from the device with cell tower triangulation data or other text entry input by the consumer device voter can also serve to authenticate identity to complete verification of a voting process with the device.

An example of an alternative durable computer readable medium is a state issued driver's license, national ID card, or governmental issued passport that can contain a handwritten signature or visually printed home Postal Service address of record. Such data card(s) can be imaged by voter using the device and then applying the captured and recorded image as computer data input by the method to supplement and serve to further verify under state, local, national or international law(s) that the voter completed voting process for post-election audit and verifications, as may be required.

The image of the government or state issued identity card can be captured by an active-pixel sensor or (APS), including the CMOS APS used most commonly in mobile Smartphone camera-based consumer devices. The captured identity signature record (e.g., driver's license) by electronic data image can then serve as a replacement to a requirement to send back a Postal Service mail card or other state or governmental ID form with handwritten signature, as the electronic equivalent of a captured verification and authentication address, using the data image (with supplemental GPS address location data from consumer device).

The image data captured and sent back may serve as a proxy and digital data substitute to a requirement to mail back a physically signed voter authentication card or absentee or other voting ballot format after voting on the device because the card is in essence, being returned in digital image data-based format to a voting authority, as a digital file using the method to provide address and handwritten signature verification(s) electronically transmitted and stored in a computer server for verification(s).

The method is capable of reading a durable computer readable medium, by example, with a Microsoft® Tag. A computer-readable Microsoft® Tag is a durable computer readable medium that can be displayed on a browser viewing screen of a PC or desktop computer that is connected to internet, with an election voting ballot or form: downloaded from or viewed on a URL displaying the computer readable medium (or printed computer readable medium added to a Postal Service voting or election related sent mail content) that brings multiple colors or geometric patterns into the two-dimensional durable computer readable medium with data coded identifiers that are technically referred to as High Capacity Color Barcodes (HCCBs).

The advanced durable computer readable medium is captured as a digital image of HCCBs employs different symbol shapes in geometric patterns and multiple colors to significantly increase the amount of information that can be stored on analog printed media and improve readability on poorly lensed CMOS image sensors on consumer devices such as mobile phones, where image recognition and processing in a mobile communication device transmits, by wireless carrier or internet, the durable computer readable image data of the tag to a website server hosted by Microsoft® or other database server providers to read, convert the image data into a URL representing vote selection data. Such methods can also utilize geolocation by including GPS data coordinates, from the mobile communication device, for voting processes.

In further embodiments, the mobile communication device is a camera phone device capable of capturing and transmitting the image of the durable computer readable medium (i.e., Microsoft.™ Tag) displayed from the PC or desktop computer viewing screen to the first server after mobile voter and device user capturing the medium with a CMOS image sensor using the camera function of the consumer device.

In some of these embodiments, once the server receives the image, the image is processed by third party software, APIs and database server look ups, resulting in the tag image selected acting as a data input selection to vote on mobile consumer device. Supplemental, reporting of corresponding postal mailing address data as reported by GPS location coordinates, can be included by the mobile device transmitting the vote in conjunction with reading the Microsoft® Tag presented in a 2D displayed format from the PC browser screen; then captured by the consumer device camera image capture and sensor functionality. The unique combination of Microsoft® Tag for instant voter access on internet-connected URL displayed on PC monitor viewing or electronic screen, with election information and Microsoft® Tag, combine with a server-based verification code registration that links secure voter code registration data with Microsoft® Tags and the security of Postal Service mail to create a new reliable election registration and voter method.

With the use of Smartphones in the hands of people with disabilities, and internet access, it is now possible to use the technology of a durable computer readable identifier in the form of a Microsoft® Tag applied onto physical postal mailings, to securely cast one's vote from their consumer device at home or other permitted physical address coordinate or range of from GPS physical address coordinates programmed for acceptance by a computer server accessed by internet through the consumer device. While specific latitude and longitude address locations are presented in this specification, the other voter identity and authentication techniques using mobile consumer device sensor methods and teachings mentioned above should also be considered.

In sharp contrast, by adding the authentication and trustworthiness methods, the instant technology platform can combine and compare by computer server database methods the registration data and data sensor linking features of the a durable computer readable identifier such as the Microsoft® Tag with the security of microchip tags applied onto Postal Service envelopes or postcards to create a new voter service platform for the disabled. This service makes it easier to use cell phones to register to vote and cast official ballots. The Votertags® services also create entirely new ways to transform voting in America and internationally.

Such new paper-verifiable method enabled with a durable computer readable medium can permit individuals to conduct secure instant voting from Smartphones and other mobile devices by combining U.S. Postal mail with the internet by using Microsoft® custom Tags in the form of durable computer readable identifier, or the application of Near-field communication (NFC) computer readable technology applied onto sent ballot voting postal mail. Generally, electronic voting machines that do not produce a paper record of every vote cast cannot be relied upon by voting authority or vote administrator to be fully trusted.

The server-based data storage method for internet voting is populated by data incorporation and overlay of third party databases capturing and storing GPS sensor and other data received from the consumer device, by wireless connecting over the internet using API applications link and compare them to physical mailing address data for look up and identification verification by the inventive method.

Typically, these databases are accessed by TCP/IP or other internet connectivity to local or remote computer system servers. Remote voter identification and application Web Services can then be accessed from cloud computing resources, using by example the Google® Chrome operating system "cloud computing," model in which programs are not installed on a PC or netbook consumer device but rather are used over the internet and accessed through a web browser. In such approach, a voter's identity and verification data will also reside on servers across the Internet, rather than exclusively on their consumer device.

Database enablement application program interface (API) perform hyperlinking with third party content storage and management services such as those provided by the Universal Postal Union (UPU) issued .Post (dot-post) top-level domain name URLs assigned to and capable of corresponding with an individual geolocation Postal Service voter mail address GPS data coordinates. For example, vendors such as Zumbox.® and Earth Class Mail.® maintain internet based postal mail address with postal address location related databases that can be accessed by online server databases and APIs to provide online data link to physical Postal Service mail address data in their online data storage systems.

The Zumbox.® API includes an electronic link to a database of 150 million U.S. postal mail addresses—virtually every physical address in the United States. The Zumbox.® service enables automated access to sending intended physical postal mail via Zumbox.® that represents a digital pipe into each street address in the United States based on physical Postal Service street addresses (i.e., USPTO Main Campus, Madison Building (East), 600 Dulany Street, Alexandria, Va. USA). This address can also be represented as an electronic equivalent and computer-readable data address in the form of a URL formatted in a.POST top level domain (TLD) issued under Universal Postal Union (UPI) standards, to provide a trusted environment to serve the information and electronic communication service needs of the voting method. Examples of URL based postal address using .post TLD including IP addresses such as: "uspto@virginia.us.post"; "600dulanystreet22314@virginia.us.post; 32degrees18m23.1N122degrees36s52.5nw.us.post; or alternatively as Decimal Degrees (DD) expressed latitude and longitude geolocation coordinates in decimal fractions using a format such as 49.5000DD-123.5000DD@gps.us.post to represent the GPS coordinates of a postal mail address represented by IP-based internet accessible electronic server data mail address or similar IP-based URL or server access data formats.

Such digital pipe into each street address in the United States or worldwide location based on physical street addresses GPS latitude and longitude coordinate data, expressed in IP-based decimal degrees that are offered as a third party API that can be integrated into computer implemented database methods described herein. The API works using REST over HTTP internet communication protocols. The term REST stands for "Representational State Transfer" and is a stateless protocol that includes the state with every communication. Additionally, REST provides access to Web services using HTTP; for internet based database storage clouds, REST would be used to access storage resources as services to match postal mail address to matching GPS location(s).

Zumbox® represents one of several third party commercial vendors, including Postal Services, creating digital storage systems that correspond to every street address in a Postal Service delivery region, through which customers, business and government(s) may address, send or receive digital computer-implemented voter communication over the internet. So mobile communication device owners (e.g., with mobile phone wireless network consumer device) can receive voter ballots and other voter registration or voting ballots from: voting authorities, individuals, and companies that send interactive, multimedia voter and election related voter mail and messages related to an internet voting ballot process or to one or more physical or electronic IP-based Postal Service mail address by internet methods that can include clickable links, and video data files related to the election vote options and selection options by vote using mobile device.

In addition to the Zumbox® database with and application program interface (API) and application service provider (ASP) models, the USPS® National Database also contains every deliverable mailing address in the United States of America. The method can generate an XML code for each Postal Services mailable address on-the-fly and store and compare the physical addresses on a business mailer's address data file to this or other Postal Service database, utilizing the database server with the captured image or location data to hyperlink and associate an electronic IP-based URL or domain name (e.g., a .POST top-level IP URL or related domain web access address) that is identified and corresponding to a confirmed physical Postal Service mail address as part of the voting method.

These aforementioned methods for data verification to enable voting teach a trustworthy and higher level for voter processing verification of identity then online banking because identity must be verified by multiple steps tied to Postal Service mail address GPS data coordinate and range permission(s) or other rules (i.e., dates and times for permitted voting by device method) and other individual identity data points that can be set under rules and permissions stored in the computer server under control of a voting authority or vote administrator organization.

Internet connected mobile devices are also important for people with disabilities. In the last several years, consumer devices such as mobile phones, or Smartphones, have played an ever-increasing role in the lives of people with disabilities as they search for ways to stay involved in election and voter registration and voting ballot process and find new ways to use this increasingly important tool. These mobile phones have opened up a new world of communication and convenience to voters with disabilities worldwide that have challenges visiting a polling location to cast their individual vote in-person, as often required under law.

Section 303(a) of HAVA includes transparency, privacy, and security for voter registration information, while at the same time meeting the challenge of real-time authentication of voters during an election by enabling the use of mobile "Smartphone" devices to cast secure votes. By Smartphone I mean consumer devices that have built-in image sensors (e.g., CMOS sensor with lens to act as a camera sensor device) to read a durable computer readable identifier affixed onto official U.S. Postal Election Mail, and other voter election campaign voter related contents mail, with secure internet connectivity also-built into the consumer device.

The iPhone®, Blackberry® and virtually every new mobile phone in the U.S. fall into this category of handy mobile phones which also represent the lifeline tool and assistive device for disabled Americans. Other manufactures such as INTEL® produce the Intel Reader, a handheld device for people who struggle to read standard texts because of conditions such as dyslexia and blindness capable of digitizing and transferring a voter ballot adding text-to-speech software.

Before consumer devices such as internet-connected Smartphone's, voting for candidates in official governmental and other elections by the disabled required more secure forms of identification and processes to keep them trustworthy. In part, these legacy, antiquated processes served to limit people with disabilities from registering to vote or sometimes deciding to go out and vote based on the weather forecast outside or public health concerns such as the H1N1 flu pandemic of 2009 that resulted in contingency plans for voter polling in response to health warnings and the possibility of people being too ill to travel to physical polling locations. Therefore, the novel invention can create an entirely new way to vote from one's home Postal Service address, as determined by cell tower geolocation data coordinates and supported by other digitally transmitted data, and be counted.

The instant method can transform election events and voting in this increasing mobile consumer communication device and digital age. It can make it simple, convenient and secure to register to vote or officially select and cast one's vote for a candidate or any public issue or question brought to a vote without the requirement to visit a physical polling location to cast or deposit a physical ballot in the physical polling place location to process a vote. The method opens a new and data verifiable way for people, especially those with disabilities, to vote and be counted with mobile convenience. In addition, the method supports mobile consumer Smartphone device convenience for improved authentication with cell tower triangulation geolocation authentication and identity security in absentee ballot processes, typically required for oversees military personnel and others whom are at overseas locations and therefore unable to visit a local polling place to vote.

This new hybrid electronic voting application bridges physical Postal Service election mail ballots and cell tower triangulation geolocation data with mobile devices for "official" election voting. Therefore, an additional advantage of the instant method is to add mobile consumer device accessibility and convenience to help re-invent antiquated paper voting processes and offer a new option to make any and every official election for those individuals with disabilities, simpler to verify their identity by data entered, captured and transmitted by consumer device selected by an individual to vote and be counted.

In addition, the method supports mobile consumer Smartphone device convenience for improved authentication with cell tower triangulation authentication and identity security in absentee ballot processes, typically required for oversees military personnel and others whom are at overseas locations and therefore unable to visit a local polling place to vote. In addition, other non-governmental voting processes can be performed from the device including: shareholder proxy vote, school board election, university student officer election, or popularity selections in response to a vote to select entertainers or other TV performers in combination with the data authentication received from mobile device and compared to voter registration data stored and accessed form a remote computer server can included.

American Idol® TV reality show voting recently surpassed 66+ million votes, mostly from mobile device text votes, exceeding the total number of votes ever recorded during an election for U.S. President. In the current text message-based American Idol® voting method, one realizes this is primarily accomplished using mobile phone text messaging services that allow unlimited voting on any issue by mobile phone. Such text based voting has proven to be unreliable and not trustworthy as multiple votes from an individual or device cannot be controlled and there is no paper-verifiable trail or trustworthy authentication system to prevent multiple voting or other fraud. The method can incorporate voting by mobile device using an SMS message that combines with the cell tower triangulation data coordinates and reports both to a third party database server for less-secure voting applications (i.e., not official governmental elections).

For the first time, the method enables trusted voting as simple as voting for a contestant on American Idol® TV. These steps are accomplished with the efficiency of mobile consumer device and internet, but the paper ballot data verification record remains the 'official' vote, that can be sent back to the voting authority or independent voter administrator of the voting processes using a form of Postal Service reply-mail, voting postcard, or paper ballot form all with a handwritten voter signature that can serve to easily confirm, re-count or re-verify the electronic internet voting over the consumer device, if necessary for audit.

A background understanding of present voter technological and administrative solutions provides support to the innovative method in improving prior voting practices, by Internet or other computer implemented means.

The technological and administrative solutions of the instant method are designed to help ensure that all citizens can vote privately and independently, a requirement of the Help America Vote Act (HAVA) of 2002 (42 U.S.C. §15441). The technology method leads to the adoption of a new method to make voting systems (including paper ballots) more accessible to all voters and make the entire election process more welcoming and accessible to individuals with disabilities.

A required component of all U.S. official voter registration and absentee ballot forms is an original signature of the registrant. That is, a properly completed voter registration or absentee ballot must include the voter's signature on the physical form itself. The signature requirement serves two purposes. First, the signature is the voter's certification (under penalties of perjury) that the information provided on the form is true to the best of the voter's knowledge and belief. The signature is thus intended to increase the likelihood that valid information is captured on the form. Second, the signature provides a method for authenticating the identity of the voter at the polling place (usually after the fact). In principle (though often not in practice), a voter's signature when he or she appears at the polling place can be compared to the signature on file if doubts arise about whether the voter is in fact the person who filled out the voter registration form. More commonly, signatures are used in processing absentee and/or mail ballots and for petition verification.

Voter registration databases often integrate an image of voter signatures into their records of registered voters and store original signatures that are captured on paper. Handwriting experts—who may be asked to judge whether two signatures are sufficiently similar—have learned from experience that a signature captured on paper provides more forensically useful information than the same signature captured only in image form. For example, the indentations on the paper registration form (indicating hand pressure with which a physical signature is made) can be compared to the paper signature captured at the polling place—such a comparison is impossible with current technology if the voter registration signature is available only in image form.

The signature requirement step has one obvious drawback for voter registration—it makes impossible a voter registration process that operates entirely online. In those instances where voters may register entirely online, some other institution (generally the state's department of motor vehicles) has on file an original signature captured on a paper form. (In this case, the signature on file does not provide the voter's certification about the truth of the information provided—the electronic submission of such information provides the certification.)

A thumbnail description of U.S. governmental voter election registration such as for the election of the President of the United States is described below by current election methods.

As a general rule, a voter registers to vote in a specific geographic jurisdiction that is determined from the residential address that he or she provides for the purpose of voting. Citizens can register to vote at election offices. Depending on the state, citizens can also obtain voter registration materials in many places, including military facilities, assisted living facilities, high schools, vocational schools, social service agencies, nursing homes, and libraries, or through voter registration drives, or by downloading materials from the Internet. In addition, the National Voter Registration Act requires all states to provide such materials at their departments of motor vehicles, departments of human services, and public assistance agencies. By filling out the required forms and providing the necessary identification, citizens in all states can also register to vote by mail. In at least three states (Washington, Kansas, and Arizona), a citizen can register to vote through the Internet if he or she already has a driver's license or a state-issued ID from that state. The voter completes the registration form and it is returned to the election office.

The returned materials are accompanied by an original signature that serves as an authentication mechanism when voter registration must be checked in the future. If the voter registers at a department of motor vehicles, the relevant information may be extracted from the information on file or provided at the department of motor vehicles (DMV) and transmitted electronically to the election office, along with the signature on file with the DMV as an authentication device for the voter at the polls. Overseas voters, and voters of the U.S. armed forces and their dependents, can sometimes register to vote by fax.

The voting Postal Service address of record determines the precinct from which the voter may cast his or her ballot, whether at the polling place, or by absentee or mail ballot, or by an early vote. A precinct is a subdivision of a local election jurisdiction, and all voters in a given precinct vote at one polling place. (Sometimes, a number of small precincts are consolidated at one polling place, and sometimes election officials can require that all voters from certain precincts vote by mail.) A local election jurisdiction is an administrative entity responsible for the conduct and administration of elections within it, and may be a county or a municipality (a city or town). Therefore, the Postal Service address can serve as a critical data authentication variable to confirm a voter's address of record to permit a vote to be cast by absentee or mail ballot, or by internet voting means using a consumer device under the method herein described.

In connection with understanding the invention in greater detail, it would be useful to define some of the common terms used herein when describing various embodiments of the invention.

The term(s), "Consumer Device" and "Mobile Communication Device" (also both known as cell phone or mobile phone device, camera phone, Smartphone, handheld device, netbook or tablet computer, palmtop or simply handheld) is a pocket-sized computing device, typically having an electronic display screen and camera lens or image capture sensor with a miniature keyboard that includes, but is not limited to pocket sized internet-connected wireless devices and other tablet devices that are larger versions of handheld mobile camera image capture devices. Generally, these devices are wirelessly connected to the internet by WiMAX.®, Wi-Fi or wireless data carriers (e.g., AT&T.®, Sprint.®, or Verizon.®). Typically they have a GPS or A-GPS receiver for sensing, determining and reporting location data, a touch screen for data entry or voter selection(s), over-the-air (OTA) software download and application program storage capability, image capture/processing and other sensors and computer circuits including removable and exchangeable SIM card for inserting into the device for communication capabilities to receive and transmit electronic data messages, including votes and voter related ballot files.

The term "Durable Computer Readable Medium" is an information storage medium that is created by a durable process. Specifically, a process shall be the combination of hardware, software, storage media, techniques and procedures used to manage, create, store, retrieve, and delete information belonging to a custodian agency that in this case, is the state or other business, consumer or governmental entity managing and administering the voting process and related data records. A process shall be a durable process if it meets all of the following criteria: (1) The process is capable of creating and storing information for the required records retention period as specified by voting rules, election rules or similar data retention policies or guidelines; (2) The process can be migrated to a successor process when necessary and will retain all information available in the original process after migration to the successor process; (3) The process maintains the integrity of information in a readily accessible manner, makes it retrievable, makes it able to be processed through an established usual or routine set of procedures using available hardware and software, and makes it accurately reproducible in a human-readable form as determined by the needs of the custodian agency; (4) The process provides for disaster recovery backups, which are periodically, depending on a retention schedule, verified for restorability and readability, and can be stored in a separate geographical location from the original information; (5) The process is demonstrated to create and maintain information for the retention period as specified, in an accurate, reliable, trustworthy, dependable and incorruptible manner; (6) The process allows the removal of information when it reaches the end of its required retention period; and (7) The process is documented so as to demonstrate to a reasonable person compliance with these criteria.

The term "Postal Mail Delivery Address" includes, but is not limited to the full and complete address in a standardized format that enables a Postal Service to deliver mail communication to an individual. In the United States, a standardized address is a complete address that can be represented, by example, on an envelope cover as: MR M MURRAY, APT C, 5800 SPRINGFIELD GARDENS, CIRSPRINGFIELD Va. 22162-1058. Other suitable forms of postal mail delivery address are detailed in U.S. Postal Service "Publication 28, Postal Addressing Standards, July 2008 (PSN 7610-03-000-3688)," and updated online at the U.S. Postal Service website and at similar international post websites and on the Universal Postal Union (UPU) website that describe and issue postal mail delivery address standards and acceptable format updates for Postal Service mailing and addressing services. It should be noted that "postal mail delivery address" is not meant to be applied to a postal Zip Code or postal region defined in a map or table, but apply to a specific, single GPS latitude and longitude coordinate and comparison data point that match to a Postal Service deliverable mail address according to a Postal Service's addressing standards.

The term "Postal Service" includes, but is not limited to a government department or agency handling the transmission of mail. In the United States, the United States Postal Service® is the independent government agency that receives, delivers, and processes mail to physical street addresses associated with individuals (i.e., a voter), businesses and residential Postal Service address location(s). In Switzerland, the corresponding government department would be Swiss-Post®. The term "Postal Mail" includes, but is not limited an entity officially designated by national authorities of a country as responsible for fulfilling the obligations arising from the transportation and delivery of Postal Service mail. Similarly, the term "Postal Mailing Address" includes, but is not limited to an entity officially designated by the national authorities of a country as responsible for fulfilling the obligations arising from its associated agreements within its national territory, corresponding to the national authorities authorized to deliver mail to a formatted mailing address to a location (corresponding to GPS mail address data coordinates) and addressed to a specific individual (i.e., voter) at a registered home mailing address or other Postal Service address of record.

The term "SIM card" refers to a "SIM" is a computer-based device that stands for Subscriber Identity Module (SIM) card. The removable SIM card allows mobile communication devices to be instantly activated, interchanged, swapped out and upgraded, all without mobile network carrier intervention. The SIM itself is tied to the wireless network, rather than the actual phone. The SIM card technology can utilize JavaCard technology (i.e., Java 2.1.1 and above and using SCWS technology for over-the-air content updates or software downloads from the internet or network carrier (e.g., Verizon®). A SIM card is a can also be sent by Postal Service mail to a designated individual's home voter mailing address or otherwise provided at a designated location to a consumer device owner to replace an existing SIM by sliding out an existing removable SIM card already in the device, or "hot swapping," for single-use application such to register vote or related voting ballot data entry voting process on the device for the designated individual to register or cast a vote and be counted.

The term "JavaCard" includes a technology that provides a secure environment for applications that run on smart cards and other devices in mobile communication devices with very limited memory and processing capabilities. Multiple applications can be deployed on a single card, and new ones can be added to it even after it has been issued to the end user. Applications written in the Java® programming language can be executed securely on cards from different vendors. The JavaCard platform can enable download over the wireless carrier associated with a mobile communications device of location-based and identify security applets developed with JavaCard technology to run on any Java Card technology-enabled smart card, independently of the card vendor and underlying hardware.

The terms "CMOS camera image capture" or "CMOS Sensor" is a sensor for camera image capture and processing now integrated into most consumer mobile devices that include built-in unit camera systems in which the lens, image sensor and processing engine are housed. An image sensor is a device that converts an optical image to an electric signal that can be sent wirelessly by a consumer Smartphone as an electronic digital data file to a server over a wireless network carrier infrastructure and internet connectivity. It is used mostly in digital cameras and other mobile imaging devices. An image sensor is typically a charge-coupled device (CCD) or a complementary metal-oxide-semiconductor (CMOS) active-pixel sensor.

The term "active-pixel sensor" or (APS), is an image sensor consisting of an integrated circuit containing an array of pixel sensors, each pixel containing a photo detector and an active amplifier. There are many types of active pixel sensors including the CMOS APS used most commonly in cell phone cameras and external/internal consumer device web cameras. Such an image sensor is produced by a CMOS process (and is hence also known as a CMOS sensor), and has emerged as an alternative to charge-coupled device (CCD) imager sensors.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

One or more features from any embodiment may be combined with one or more features of any other embodiment without departing from the scope of the invention.

What is claimed is:

1. A computer-implemented method for authenticating a mobile device for electronic voting over the internet comprising
   a. storing a geographical location of a voter's postal mail delivery address prior to an election, wherein the geographical location comprises longitude and latitude coordinates, in a database stored in a computer server to which an election authority has access;
   b. upon receiving from a mobile device at the computer server an internet vote by the voter in the election and the geographical location of the device, determining whether the geographical location of the mobile device is within a predetermined distance from the registered geographical location for the voter by cell tower triangulation geolocation and
   c. if the geographical location of the mobile device is not within the predetermined distance from the registered postal address for the voter, rejecting the internet vote.

2. The method of claim 1 further comprising cross-referencing the voter's registered postal mail delivery address to the longitude and latitude geographical location data coordinates stored in the computer server memory.

3. The method of claim 1 further comprising determining the distance between the geographical location of the device and the voter's registered geographical location, wherein if the determined distance is greater than the predetermined distance, sending a message to the mobile device to indicate that the internet vote has not been accepted because the geographical location of the device exceeds the predetermined distance from the voter's registered geographical location longitude and latitude coordinates.

4. The method of claim 1, wherein the mobile device comprises a voting software application program accessible over the internet and a Global Positioning System (GPS) data sensing receiver, wherein the device is configured to: communicate GPS location sensor data with the voting software program application over a first transmission network; transmitting voting data to a first server, the data comprising location information data coordinates; and performing a data comparison in a second network server to determine an indication that the location is a GPS data location address acceptable by the voter application program rules and permissions programmed by a voting authority or other voting administrator to process an individual vote from the device that may include rules and permissions as to date(s) and time(s) acceptable for voting.

5. The method of claim 1, wherein the postal address can be the same address as a physical election voting or polling location address, identified as location data coordinates, that is identified by a voting authority as an acceptable location under the method to enable a voter to vote using the device while physically located at a voter polling place.

6. The method of claim 1, wherein the mobile device is provided at a physical election polling place by a voting authority that includes one or more of the following elements designed to assist voters with disabilities to process a vote; a voter software launch application to initiate a voting process on the device; a tactile keyboard for data entry, an audible data file translation software application to translate a ballot displayed on the device screen into an audible voice data file to audibly read the voter ballot contents displayed to the voter, a corresponding voice recognition data entry software program to capture voice response commands by the voter and then confirm the entry by audible data file translation to enter a vote by the method.

7. The method of claim 1, wherein a sample voter ballot or mock election vote process is provided online at a URL accessed web page address for the purpose of permitting a voter with a mobile device to test their device, in advance of an actual vote event, to determine if their device is suitable for processing a vote under the method, and to further permit a voter to enter and complete a sample voting process with the device.

8. The method of claim 1 comprising capturing with a mobile device camera a physical authentication image selected from the group consisting of the voter's driver's license, handwritten signature document, face, passport, and durable computer readable identifier medium, and transmitting the image by the device to an election authority computer server.

9. The method of claim 8, comprising capturing with a mobile device camera a handwritten signature document in the form of a state issued driver's license, national ID card, an election vote absentee ballot, or governmental issued passport comprising a handwritten signature of the voter.

10. The method of claim 1 comprising a step of using data from a self-contained magnetometer, altimeter, or gyroscope sensor to authenticate geographical location wherein the mobile device is a consumer mobile cellular telephone device, a Smartphone, or a portable computer tablet device; wirelessly connected to the internet.

11. A computer system for authenticating a mobile device for electronic voting over the internet comprising
  a. a voter registration module accessed by a computer-implemented hardware server configured to store a geographical location of a voter's postal mail delivery address prior to an election, wherein the geographical location comprises longitude and latitude coordinates, in a database;
  b. an authentication module configured to (1) receive from a mobile device a vote by the voter in the election; (2) receive from a mobile device carrier cell tower triangulation data identifying the geographical location of the mobile device; (3) determine whether the geographical location of the mobile device is within a predetermined distance from the registered geographical location for the voter; and (4) if the geographical location of the mobile device is not within the predetermined distance from the registered postal address for the voter, to reject the internet vote.

12. The computer system of claim 11 further comprising an Application Program Interface (API) data module stored in a mobile device or stored in a remote server accessible over the internet by a mobile device at the request of the voter.

13. The computer system of claim 11 further comprising a Subscriber Identification Module (SIM) card identification module comprising a voting software application download to the SIM card configured to, enable reference data collection, location data validation, and authentication to vote on the device.

14. The computer system of claim 11 further comprising a query module in the Subscriber Identification Module (SIM) card memory, the query module configured to communicate with the mobile device and a remote reference database server storing registered postal address location data for computational data matching to permit the capture and storage of a vote in an election by the computer-implemented server.

15. The computer system according to claim 11, wherein the authentication module is configured to compare the radial distance between the geographical location reported by the mobile device and the geographical location of the registered postal address and to reject the vote if the radial distance exceeds a predetermined value.

16. The computer system according to claim 11 adapted to authenticate electronic shareholder proxy voting.

17. The computer system according to claim 11, wherein the computer server further includes voter communication content over the internet comprising clickable internet links or video data files related to election vote selection options on mobile device.

18. The computer system according to claim 11 adopted to include opt-in permission registration for a voter to register a Consumer Device to receive advertising sponsored messages on the mobile device and a computer server system to calculate fees to be charged to a voting authority for sending advertising messages, votes and voter polling replies in response to advertising sponsored messages in a voter election, polling or shareholder meeting.

19. The computer system according to claim 11 adapted to authenticate a voter, prior to making a vote election on the mobile device by a first automated physical location check-in registration process to electronically authenticate and report location of the mobile device in combination with a second check-in registration step that requests a voter's password be entered into mobile device or electronically reported by mobile device to the computer system.

20. A computer system for authenticating a mobile device for a transaction over the internet comprising
  a. a hardware server configured to register and store in a database geographical location longitude and latitude coordinates of an individual's postal mail delivery address;
  b. an authentication module configured to
    (1) receive from a mobile device a transaction;
    (2) receive, from a mobile device, carrier cell tower triangulation data identifying the current geographical location of the mobile device;
    (3) determine whether the current geographical location of the mobile device is within a predetermined distance from the registered geographical location of the individual's postal mail delivery address; and
    (4) reject the transaction if the geographical location of the mobile device is not within the predetermined distance from the registered postal address for the individual.

21. The method of claim 1 wherein step b comprises determining whether the geographical location of the mobile device is within a predetermined distance using Assisted GPS data.

* * * * *